United States Patent
Uchino

(10) Patent No.: US 7,457,000 B2
(45) Date of Patent: Nov. 25, 2008

(54) IMAGE INPUT SYSTEM, CONVERSION MATRIX CALCULATING METHOD, AND COMPUTER SOFTWARE PRODUCT

(75) Inventor: Fumiko Uchino, Otokuni-gun (JP)

(73) Assignee: Konica Minolta Holding, Inc., Tokyo (JP)

( * ) Notice: Subject to any disclaimer, the term of this patent is extended or adjusted under 35 U.S.C. 154(b) by 964 days.

(21) Appl. No.: 10/965,447

(22) Filed: Oct. 14, 2004

(65) Prior Publication Data

US 2005/0231740 A1 Oct. 20, 2005

(30) Foreign Application Priority Data

Apr. 20, 2004 (JP) ............... 2004-124140

(51) Int. Cl.
*H04N 1/60* (2006.01)
*H04N 1/46* (2006.01)
*G03F 3/08* (2006.01)

(52) U.S. Cl. .............. 358/1.9; 358/509; 358/515; 358/518

(58) Field of Classification Search ............ 358/1.9, 358/509, 515, 523
See application file for complete search history.

(56) References Cited

U.S. PATENT DOCUMENTS 7,158,144 B2 * 1/2007 Shiraiwa et al. ............ 345/589

2005/0012948 A1 * 1/2005 Gotoh et al. ................ 358/1.9

FOREIGN PATENT DOCUMENTS

JP 2001-078202 (A) 3/2001
JP 2003-169339 (A) 6/2003

* cited by examiner

*Primary Examiner*—Houshang Safaipour
(74) *Attorney, Agent, or Firm*—Sidley Austin LLP

(57) ABSTRACT

The present invention provides a technique capable of promptly and easily acquiring object color component data of a plurality of subjects even if the spectral distribution of light illuminating said plurality of subjects is not known in advance. For example, under predetermined conditions of irradiating a subject with predetermined illumination light by using an electronic flash, an image input system captures an image of a first subject to thereby acquire first color image data. On the basis of the acquired first color image data, the image input system estimates first object color component data of the first subject. After that, the image input system captures an image of the first subject in unknown illumination environments to thereby acquire second color image data. By using the first object color component data and the second color image data, the image input system estimates the spectral distribution of unknown illumination. Subsequently, on the basis of the estimated spectral distribution of unknown illumination, the image input system calculates a conversion matrix for converting color image data of the subject acquired in the unknown illumination environments into object color component data.

9 Claims, 14 Drawing Sheets

F I G . 5
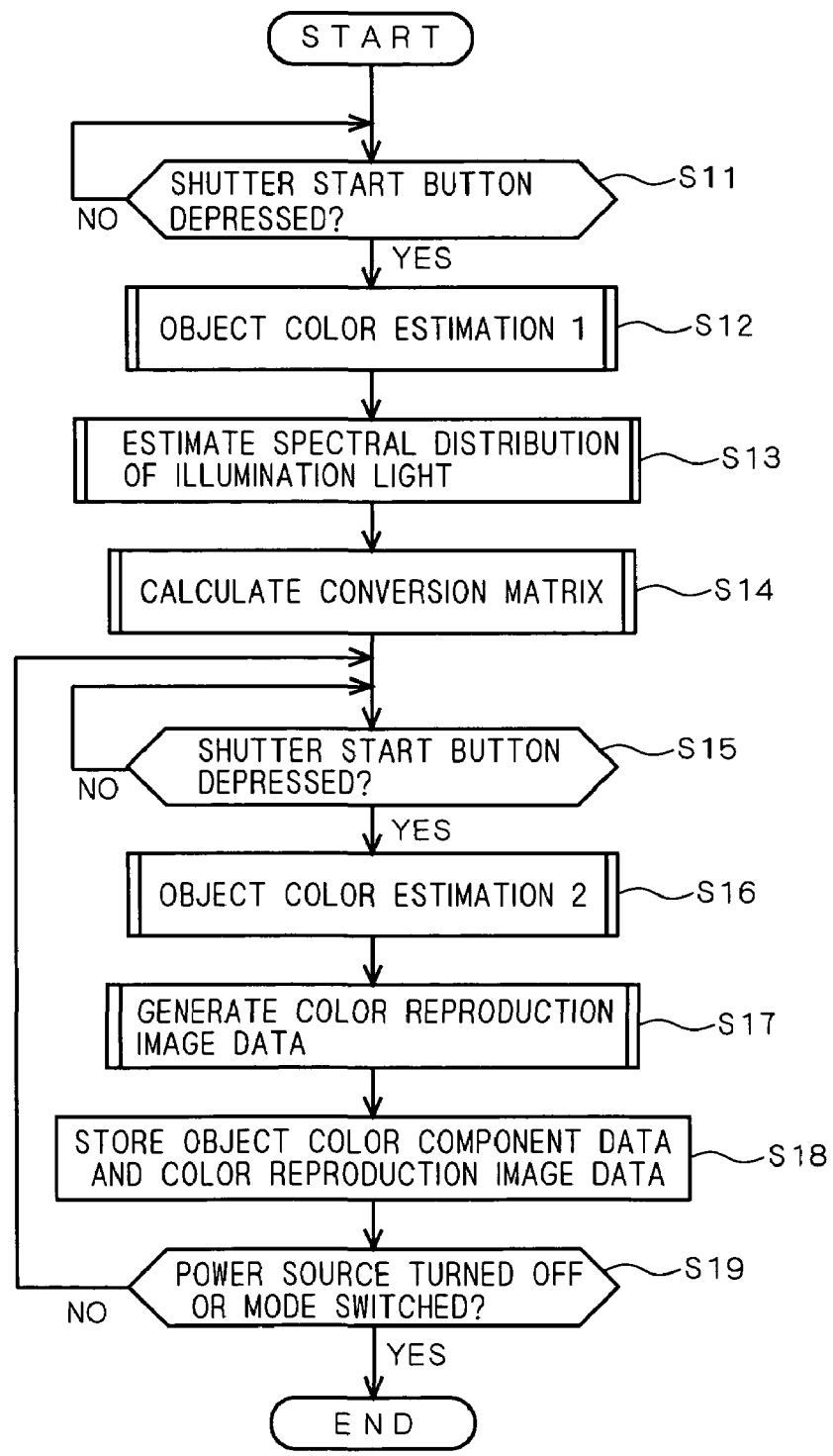

F I G . 1 1
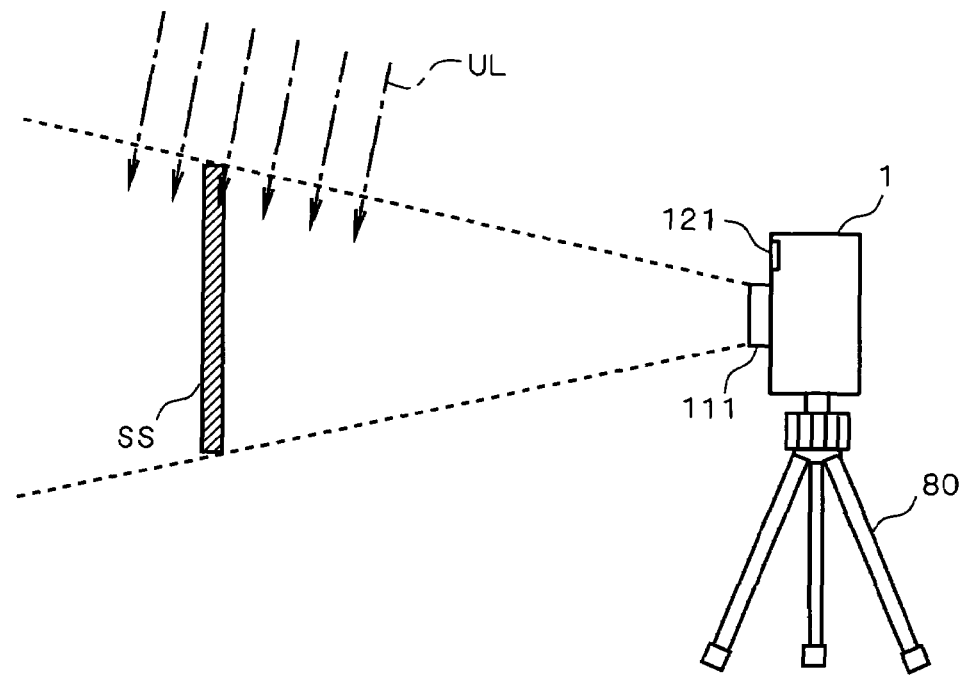
F I G . 1 2
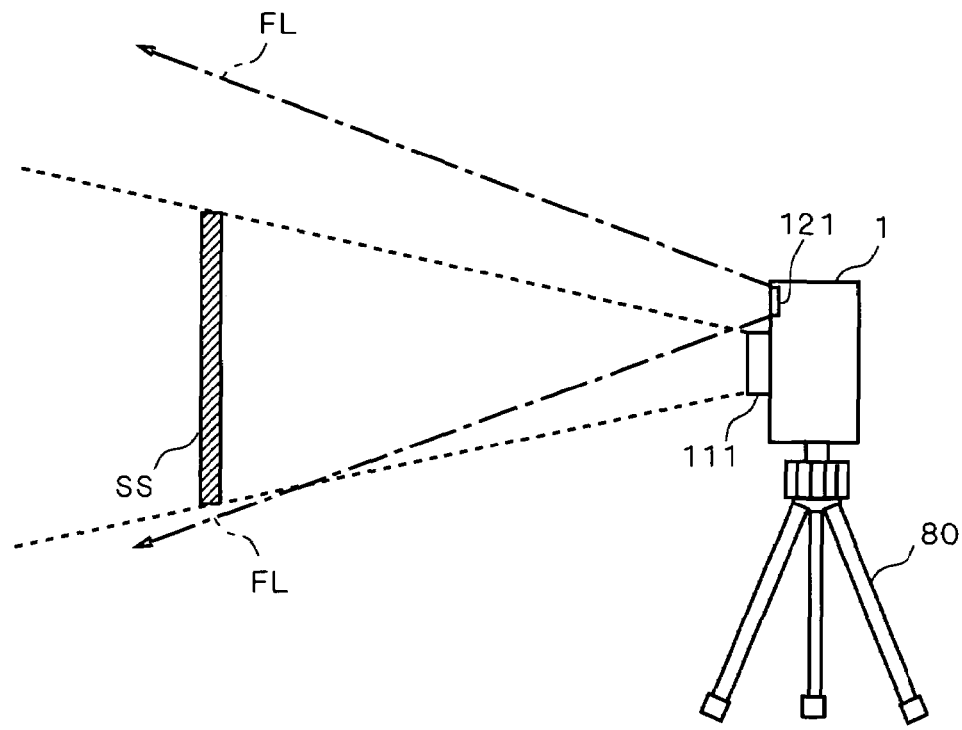

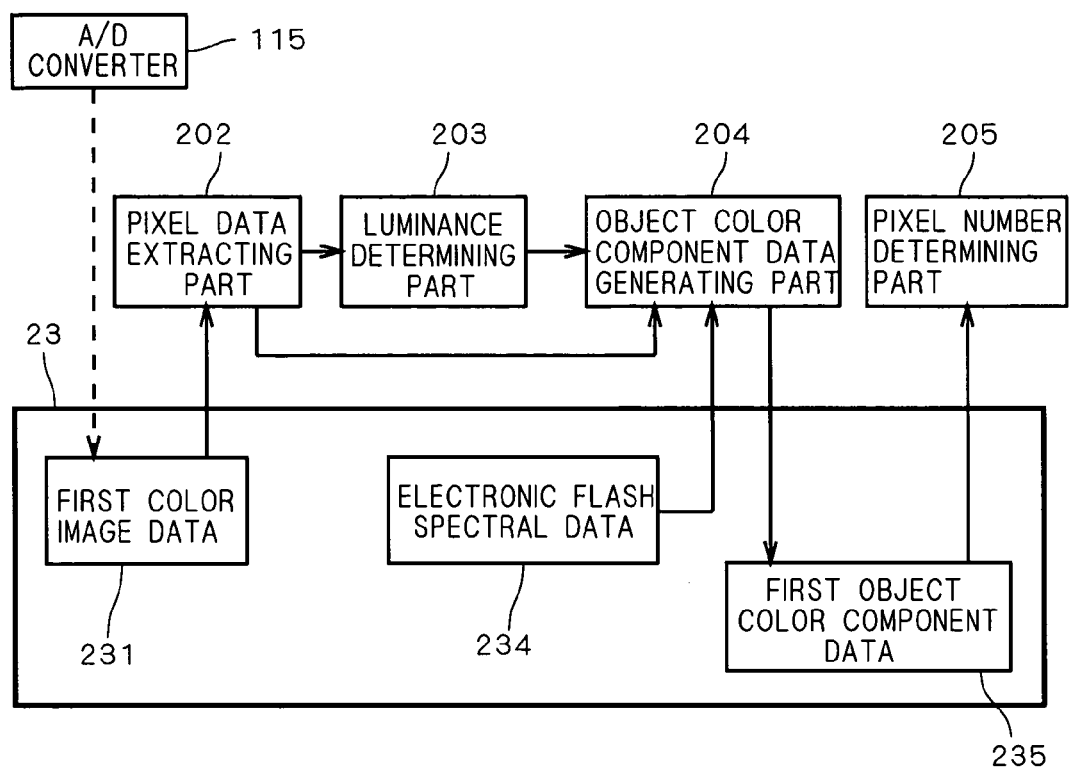
F I G . 1 4

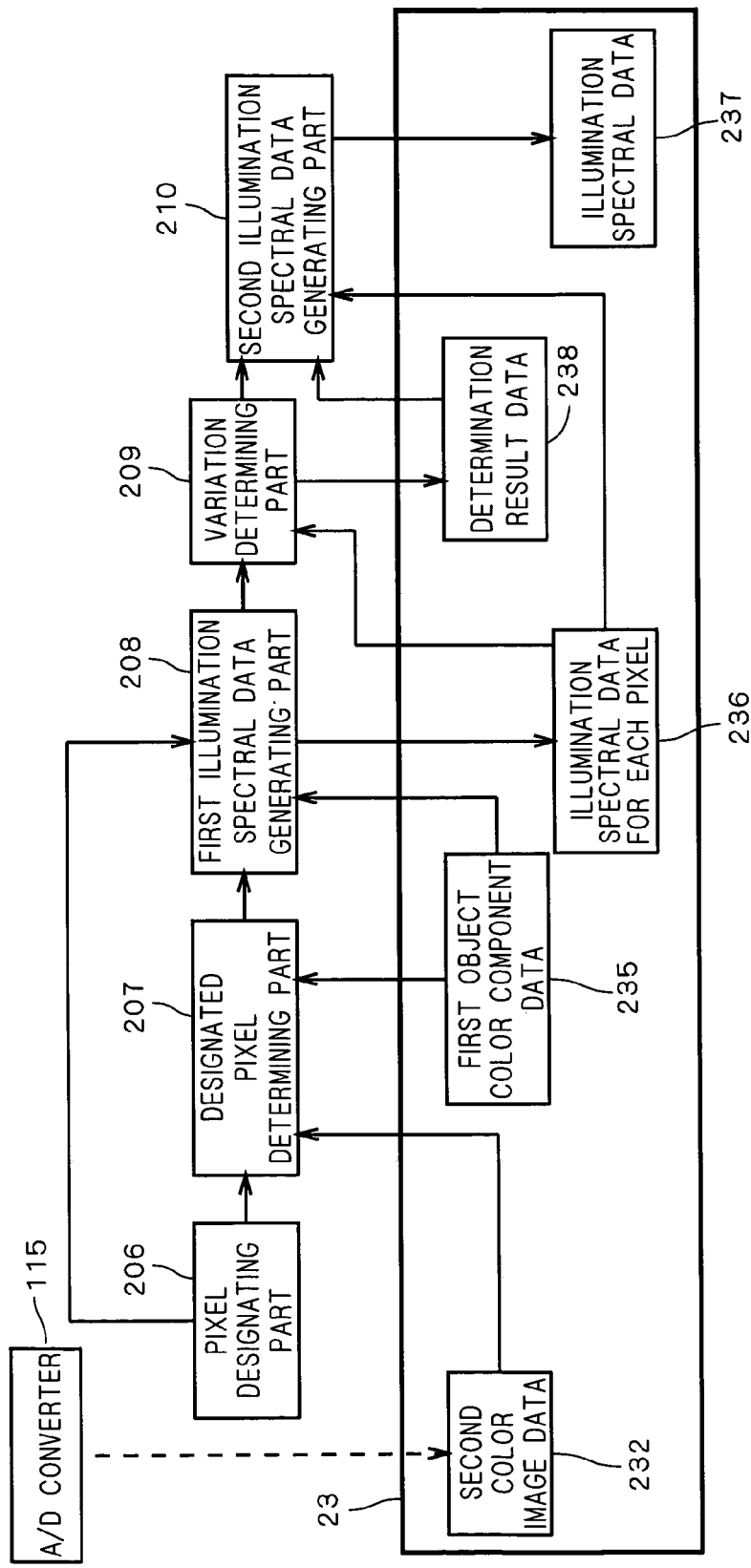

| A1 | A2 | A3 | A4 |
|---|---|---|---|
| A5 | A6 | A7 | A8 |
| A9 | A10 | A11 | A12 |

G

F I G . 1 8
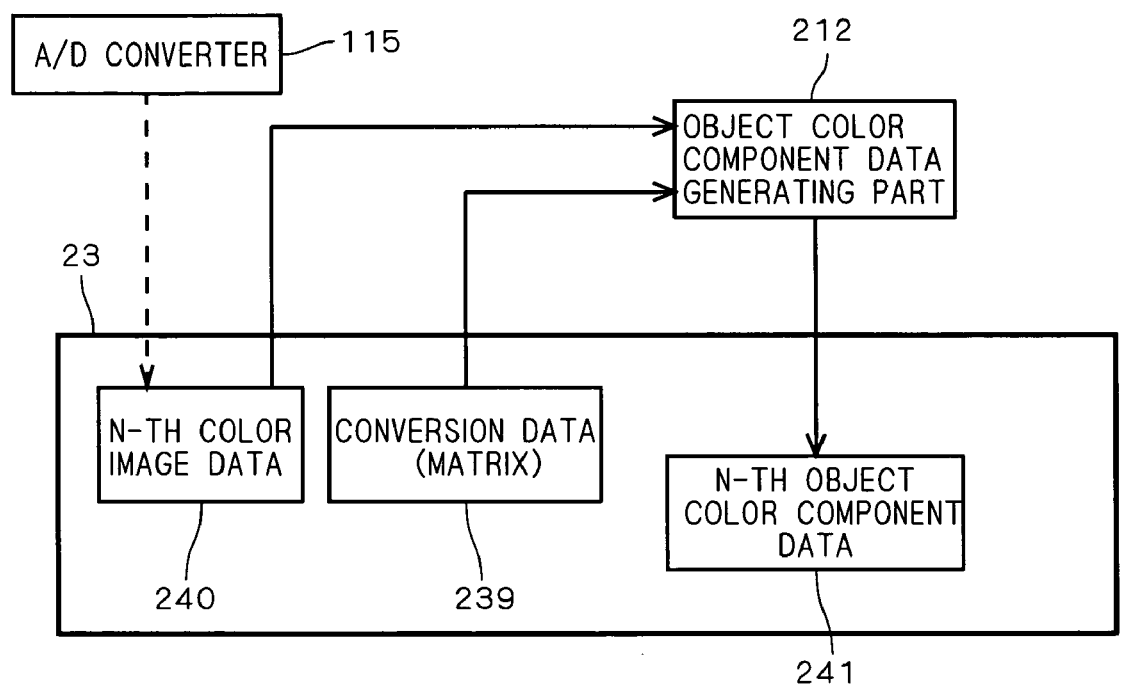

IMAGE INPUT SYSTEM, CONVERSION MATRIX CALCULATING METHOD, AND COMPUTER SOFTWARE PRODUCT

This application is based on application No. 2004-124140 filed in Japan, the contents of which are hereby incorporated by reference.

BACKGROUND OF THE INVENTION

1. Field of the Invention

The present invention relates to a technique for acquiring image data of a subject and a technique for converting image data.

2. Description of the Background Art

The color vision of a human being has a nature called color constancy that even if a color of a light source for illuminating an object changes with time, a human being can perceive the color as almost the same color if the object is unchanged. From a calculation logic viewpoint, it is considered that color constancy is realized by estimating spectral reflectance of an object as a physical amount peculiar to the object on the basis of light reflected from the object.

Consequently, hitherto, a technique has been proposed, which estimates spectral reflectance of an object (to be expressed more generally, data corresponding to image data obtained by eliminating the influence of an illumination environment (hereinafter, referred to as "object color component data")) from image data (hereinafter, also properly referred to as just "image") obtained by a digital camera or the like (see, for example, Japanese Patent Application Laid-Open Nos. 2001-78202 and 2003-169339).

Concretely, the technique disclosed in Japanese Patent Application Laid-Open No. 2001-78202, by using differential image data between image data obtained by capturing an image with electronic flash light and image data obtained by capturing an image without electronic flash light and a spectral distribution of electronic flash light, object color component data can be obtained. From image data based on light from a subject through a predetermined filter, image data based on light from the subject without using the predetermined filter, and spectral transmittance, object color component data can be obtained.

In the technique disclosed in Japanese Patent Application Laid-Open No. 2003-169339, image-capturing is performed with electronic flash light by setting the aperture value to the maximum and setting the shutter speed to the highest, image data of a subject illuminated with electronic flash light is regarded as image data acquired by using only the electronic flash light as illumination light, and object color component data can be obtained from one piece of the image data and the spectral distribution of the electronic flash light.

The conventional techniques described above have the following problems.

In the method of obtaining the object color component data by using the electronic flash light, if a subject is not positioned in a distance where electronic flash light sufficiently reaches, the object color component data of the subject cannot be obtained. In other words, if the spectral distribution of light for illuminating the subject is not known in advance, the object color component data of the subject cannot be obtained. Each time the subject is changed, electronic flash light has to be emitted and a large amount of energy is needed.

On the other hand, in the method of obtaining the object color component data by using a filter, even if the spectral distribution of light illuminating the subject is not known, object color component data of the subject can be obtained so that the energy consumption amount can be reduced.

In the method of obtaining the object color component data by using the filter, however, each time the subject is changed, two image capturing operations consisted of an image capturing operation using a predetermined filter and an image capturing operation without using a predetermined filter have to be performed. Therefore, problems occur such that (i) image-capturing time for obtaining object color component data is long and (ii) a mechanism for driving the filter and the like is additionally needed and the configuration is complicated.

SUMMARY OF THE INVENTION

The present invention is directed to an image input system.

According to the present invention, the image input system comprises: an acquiring part for acquiring color image data of a subject; an object color estimating element for estimating first object color component data of a first subject by using first color image data of the first subject acquired by the acquiring part under predetermined conditions; an illumination light estimating element for estimating a spectral distribution of stationary light on the basis of second color image data of the first subject acquired by the acquiring part under the stationary light and the first object color component data; and a calculating element for calculating a conversion matrix for converting third color image data of a second subject acquired under the stationary light to second object color component data of the second subject by using the spectral distribution.

Once the conversion matrix is calculated, even if a subject is changed, only by acquiring color image data of the subject and converting the data by the conversion matrix, object color component data of the subject can be easily acquired. Therefore, even when the spectral distribution of light for illuminating the subject is not known in advance, object color component data of a plurality of objects can be promptly and easily acquired.

The present invention is also directed to a conversion matrix calculating method.

The present invention is also directed to a computer software product including a recording medium on which a computer-readable software program is recorded.

Therefore, an object of the present invention is to provide a technique capable of promptly and easily acquiring object color component data of a plurality of objects even when the spectral distribution of light illuminating a subject is not known in advance.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a flowchart showing a flow of an image capturing operation in an object color acquiring mode;

FIG. 11 is a schematic diagram showing a state where an image of a first subject is captured with electronic flash light;

FIG. 12 is a schematic diagram showing a state where an image of the first subject is normally captured;

FIG. 14 is a block diagram showing functions related to operation of object color estimation 1;

FIG. 15 is a block diagram showing functions related to operation of estimating the spectral distribution of illumination;

FIG. 18 is a block diagram showing functions related to operation of object color estimation 2.

DESCRIPTION OF THE PREFERRED EMBODIMENTS

Hereinafter, preferred embodiments of the present invention will be described with reference to the drawings. In the following description, influences exerted by illumination environments on color image data acquired by a digital camera will be referred to as follows: (1) an influence exerted by illumination environments "excluding" electronic flash light will be referred to as "an influence of stationary illumination environments"; (2) an influence exerted by illumination environments of "only" electronic flash light will be referred to as "an influence of an emitted-light illumination environment"; and (3) an influence exerted by general illumination environments "including" electronic flash light will be referred to as "an influence of general illumination environments".

1. Configuration of Image Input System

Figure 1:
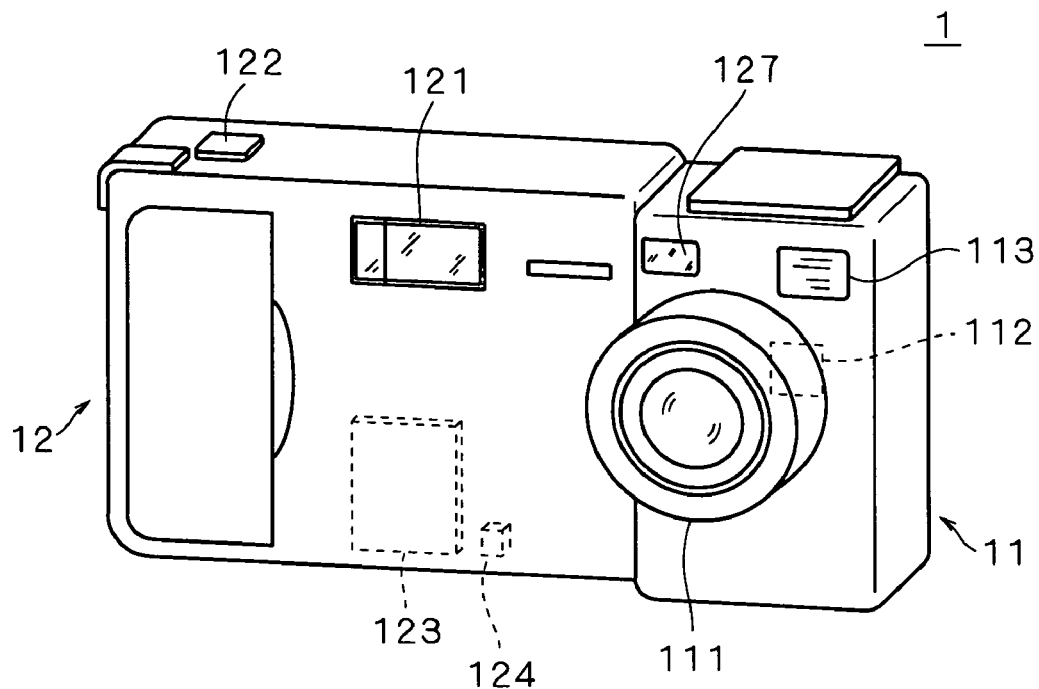
FIG. 1 is a perspective view showing the appearance of an image input system according to a preferred embodiment of the present invention.

FIG. 1 is a perspective view generally showing a digital camera 1 as an example of an image input system according to a preferred embodiment of the present invention. The digital camera 1 is an image capturing apparatus having a lens unit 11 for capturing an image, and a main body 12 for processing color image data acquired as digital data by the lens unit 11.

The lens unit 11 has a lens system 111 including plural lenses and a CCD (Charge-Coupled Device) 112 for capturing an image of a subject as an object to be image-captured via the lens system 111. An image signal outputted from the CCD 112 is sent to the main body 12. In the lens unit 11, a finder 113 for capturing a subject by the operator, a light control sensor 127, and the like are also disposed.

The main body 12 includes a built-in electronic flash 121 and a shutter start button 122. The operator captures a subject via the finder 113 and operates the shutter start button 122, thereby electrically acquiring an image by the CCD 112. As necessary, the built-in electronic flash 121 emits electronic flash light toward the subject. The CCD 112 is image capturing means of three bands for obtaining values of colors of R, G, and B as values of pixels, and acquires a color image signal (color image data) of the subject.

An image signal from the CCD 112 is subjected to processes, which will be described later, in the main body 12 and, as necessary, stored in an external memory 123 (for example, a memory card) inserted in the main body 12. The external memory 123 is ejected from the main body 12 when the operator opens a cover in the under surface of the main body 12 and operates an ejection button 124. Data stored in the external memory 123 as a storage medium can be transferred to another apparatus by using a computer or the like provided separately. Vise versa, data stored in the external memory 123 in another apparatus can be read by the digital camera 1.

Figure 2:
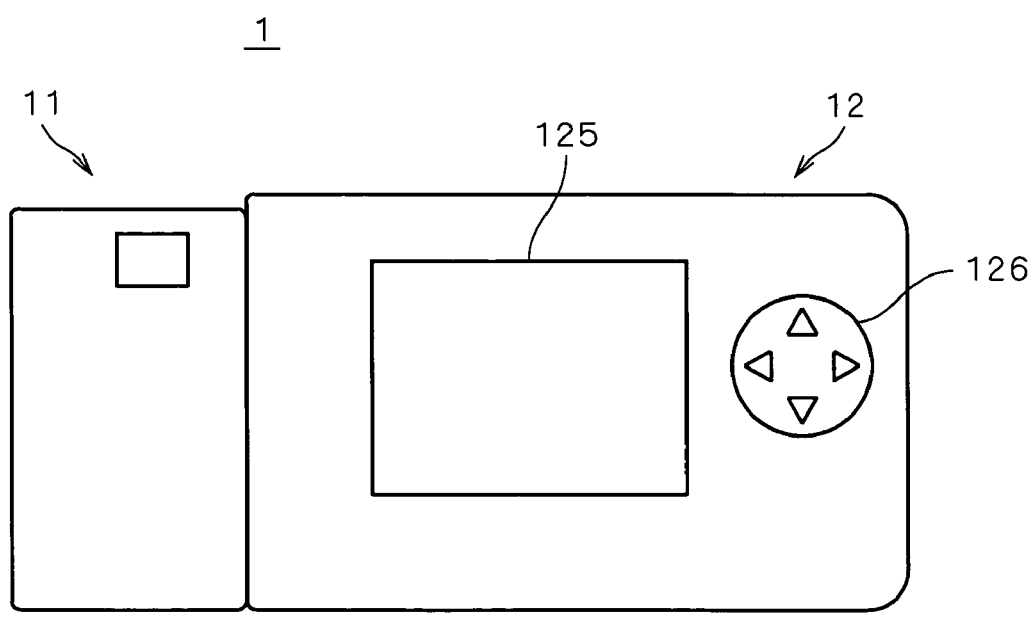
FIG. 2 is a rear view showing the appearance of the image input system.

FIG. 2 is a diagram showing a state where the digital camera 1 is seen from the rear side. In the center of the rear face of the main body 12, a liquid crystal display 125 for displaying a captured image or a menu to the operator is provided. On a side of the display 125, an operation button 126 for receiving an input operation in accordance with a menu displayed on the display 125 is provided. With the operation button 126, operation of the digital camera 1, maintenance of the external memory 123, reproduction of an image, setting of an image capturing mode, and the like can be performed.

The digital camera 1 has, as image capturing modes, a normal image capturing mode for performing a normal image capturing operation and a mode for acquiring object color component data corresponding to image data obtained by eliminating the influence of general illumination environments (also referred to as "object color acquiring mode"). The user can select either the normal image capturing mode or the object color acquiring mode by the operation button 126.

Figure 3:
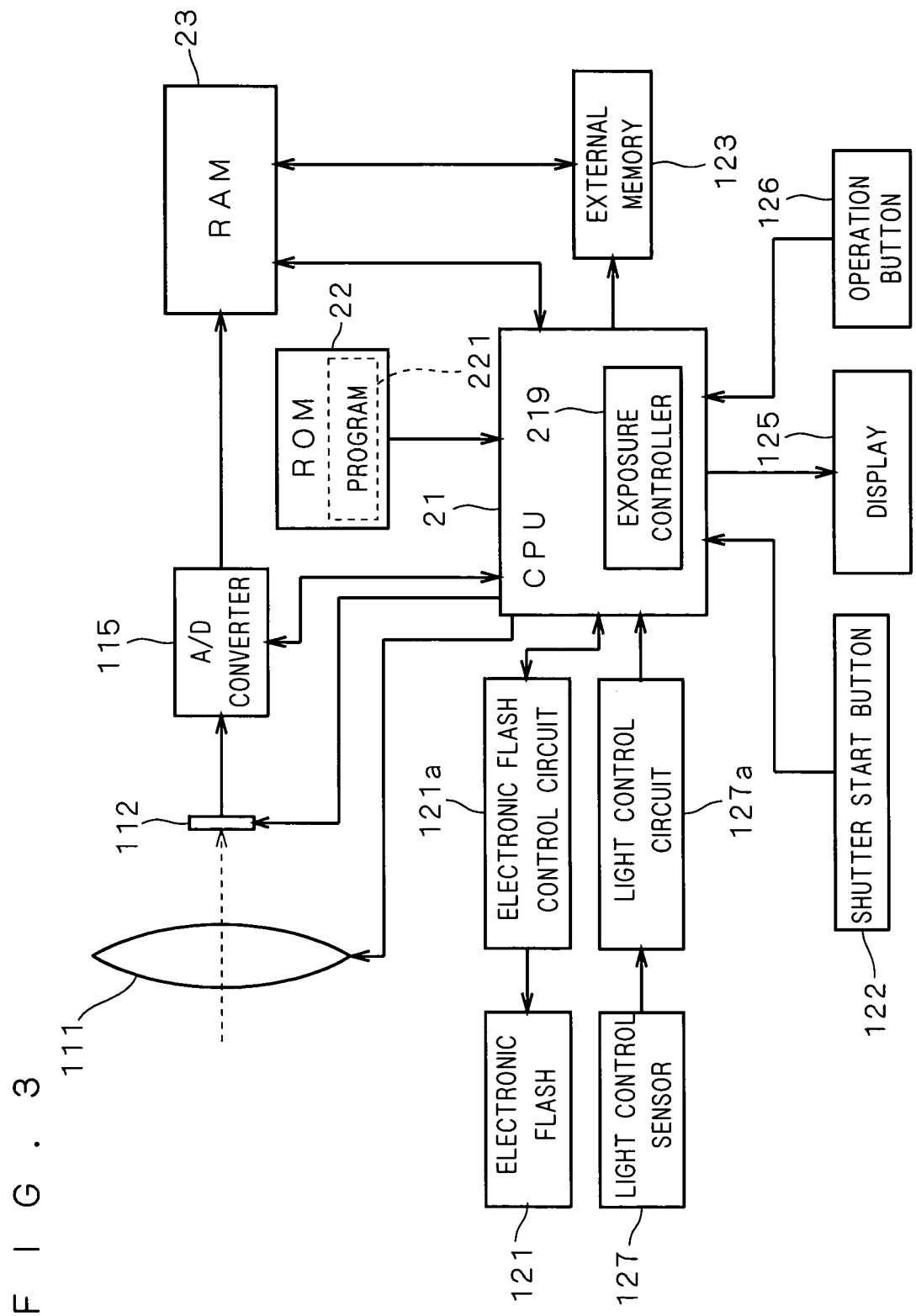
FIG. 3 is a block diagram schematically showing the configuration of the image input system.

FIG. 3 is a block diagram schematically showing mainly components for executing processes related to the present invention in the configuration of the digital camera 1.

In the configuration of FIG. 3, the lens system 111, CCD 112, an A/D converter 115, the shutter start button 122, a CPU 21, a ROM 22, and a RAM 23 realize the function of acquiring an image. Specifically, when a light image of a subject is formed on the CCD 112 by the lens system 111 and the shutter start button 122 is depressed, the image signal from the CCD 112 is converted to a digital image signal by the A/D converter 115. The digital image signal obtained by the conversion of the A/D converter 115 is stored as image data in the RAM 23 in the main body 12. The processes are controlled by the CPU 21 operating in accordance with a program 221 stored in the ROM 22.

The external memory 123 is connected to the RAM 23 and various data is transferred between the external memory 123 and the RAM 23 on the basis of an input operation on the operation button 126. An image or information to the user is switched and displayed on the display 125 on the basis of a signal from the CPU 21.

The built-in electronic flash 121 is connected to the CPU 21 via an electronic flash control circuit 121a and start and stop of light emission of the built-in electronic flash 121 is controlled by the electronic flash control circuit 121a. The light control sensor 127 receives reflection light from the subject of electronic flash light and a light reception amount in the light control sensor 127 is calculated by a light control circuit 127a.

The CPU 21, ROM 22, and RAM 23 provided for the main body 12 realize the function of processing images. Concretely, the CPU 21 performs image processing on an acquired image while using the RAM 23 as a work area in accordance with the program 221 stored in the ROM 22.

An exposure control in the digital camera 1 is executed by adjusting shutter speed (integral time of the CCD 112) and the aperture value (the aperture diameter of a diaphragm included in the lens system 111). An exposure controller 219 in FIG. 3 is a function realized by the CPU 21, ROM 22, RAM 23, and the like and performs settings and controls on the shutter speed and the aperture value (that is, parameters regarding exposure).

2. Outline of Object Color Acquiring Mode

Figure 4:
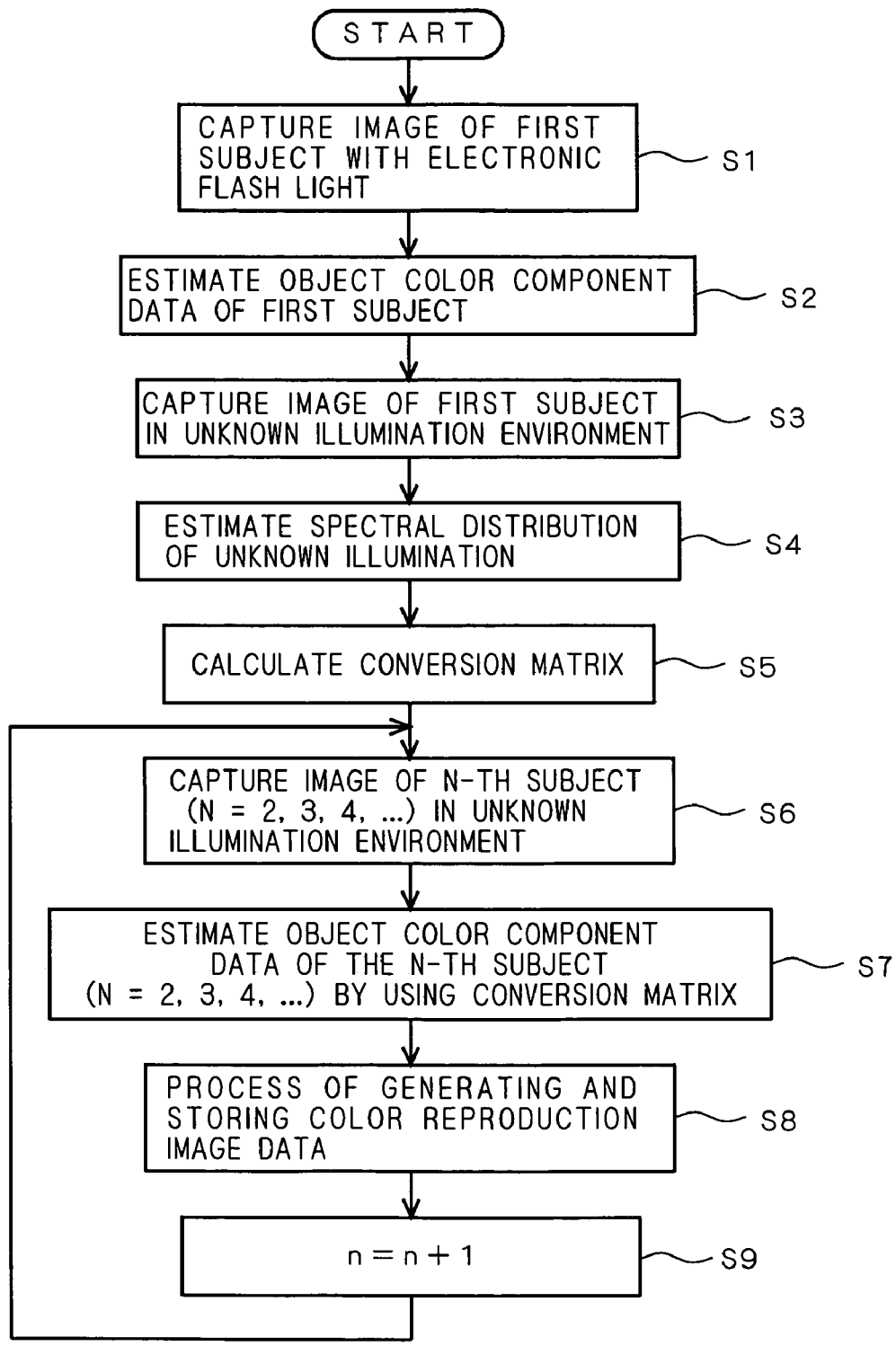
FIG. 4 is a diagram showing a flow of an operation of estimating object color component data in an unknown illumination environment.

FIG. 4 is a diagram showing a flow of main operations of the digital camera 1 performed at the time of estimating object color component data of a plurality of subjects under stationary light whose spectral distribution is not known in advance (hereinafter, also referred to as "unknown illumination") in accordance with time. The operations shown in FIG. 4 are performed when the digital camera 1 is set in the object color acquiring mode. In the operations shown in FIG. 4, by performing image-capturing while switching a plurality of subjects in accordance with time in the unknown illumination environment, object color component data of each subject can be estimated.

As shown in FIG. 4, in the object color acquiring mode, a matrix for converting color image data obtained in the unknown illumination environment to object color component data (hereinafter also referred to as "conversion matrix") is calculated (steps S1 to S5). After that time, color image data of each subject in the unknown illumination environment is obtained and can be converted to object color component data by using the conversion matrix (steps S6 to S9).

Concretely, first, a sample as a reference is regarded as a subject (hereinafter, also referred to as "first subject") and an image thereof is captured with electronic flash light, thereby obtaining color image data of the first subject (hereinafter, also referred to as "first color image data") (step S1). At the time of capturing an image with electronic flash light, exposure parameters are set so that the aperture value is the maximum and the shutter speed is the highest. According to the principle 1 of calculating the spectral reflectance to be described later, the object color component data of the first subject (hereinafter, also referred to as "first object color component data") is estimated by using the first color image data (step S2).

After that, an image of the first subject is captured in the unknown illumination environment, thereby obtaining color image data (hereinafter, also referred to as "second color image data") (step S3). According to the principle of estimating the spectral distribution of the unknown illumination to be described later, the spectral distribution of the unknown illumination is estimated by using the first object color component data and the second color image data (step S4).

Further, on the basis of the spectral distribution of the unknown illumination estimated in step S4, the conversion matrix is calculated (step S5).

After that, while sequentially changing subjects, an image of the n-th subject (n=2, 3, 4, . . . ) is captured in the unknown illumination environment, thereby obtaining color image data of the n-th subject (step S6), and the object color component data of the n-th subject is estimated by using the conversion matrix in accordance with the principle 2 for obtaining the spectral reflectance which will be described later (step S7). The object color component data is data substantially corresponding to the spectral reflectance of the subject.

In step S8, color image data for reproduction which is desired by the user (hereinafter, also referred to as "color reproduction image data") is generated by using the object color component data estimated in step S7.

Although not shown, by either turning off the power source of the digital camera 1 or canceling the object color acquiring mode, the digital camera 1 forcedly goes out from the operation flow shown in FIG. 4.

The principle 1 of obtaining the spectral reflectance of a subject, a method of calculating the conversion matrix, the principle of estimating the spectral distribution of unknown illumination, the principle 2 of obtaining the spectral reflectance of the subject, and generation of the color reproduction image data will be sequentially described.

2-1. Principle 1 of Obtaining Spectral Reflectance

The spectral reflectance is calculated on the basis of color image data constructed by data of three wavelength regions of R, G, and B acquired by capturing an image with electronic flash light (that is, image data according to spectral components in the three wavelength regions of R, G, and B) (hereinafter, simply referred to as "color image data"). An example of the method of calculating the spectral reflectance will now be described.

As described above, the digital camera 1 can obtain three pieces of image data corresponding to three different wavelength regions. That is, the digital camera 1 can obtain captured images corresponding to the first to third different wavelength regions. In the following, the case of obtaining m pieces of image data corresponding to "m" different wavelength regions will be described in a more generalized manner.

In each of the cells of the CCD 112, light reception intensity (sensor response) $v_i$ (i=1, . . . , m) corresponding to the first to the m-th (where m=3) wavelength regions is measured. In the following description, it is assumed that each cell is regarded as one pixel and light reception intensity $v_i$ (i=1, . . . , m) of each pixel is measured.

The light reception intensity $v_i$ is obtained as a pixel value in each pixel position (x, y) in each image, so that it is a function of each of coordinate values x and y.

A pixel value vi(x, y) in the position (x, y) in a captured image corresponding to the i-th wavelength region (i=1, . . . , m) is expressed by the following Expression 1.

$$vi(x, y) = \int_{\lambda 1}^{\lambda 2} ti(\lambda)E(\lambda)S(\lambda)r(x, y, \lambda)d\lambda \quad \text{Expression 1}$$

$$(i = 1, \ldots, m)$$

where r(x, y, λ) expresses reflectance (that is, spectral reflectance) at each wavelength λ in the image position (x, y) of an object to be image-captured (subject), and S(λ) indicates total spectral sensitivity of an image capturing system (hereinafter, also referred to as "image capturing system total spectral sensitivity"). The image capturing system total spectral sensitivity is total spectral sensitivity in which not only spectral sensitivity excluding an RGB filter of the CCD 112 but also spectral sensitivity of a lens system are considered. In other words, the image capturing system spectral sensitivity is spectral sensitivity of an image capturing system including the CCD 112 excluding the RGB filter and the lens system. E(λ) expresses the spectral distribution of illumination, and ti(λ) indicates spectral transmittance corresponding to the first to m-th wavelength regions. λ1 and λ2 denote the lower-limit and upper-limit wavelengths, respectively, of an integral range.

To simplify mathematical matters, the spectral distribution is made discrete and the relation of m wavelength regions expressed by Expression 1 can be expressed as Expression 2. In Expression 2 and subsequent expressions, expressions regarding the position (x, y) will be properly omitted.

$$v = TESr \Leftrightarrow \begin{bmatrix} v_1 \\ v_2 \\ \vdots \\ v_m \end{bmatrix} = TES \begin{bmatrix} r_1 \\ r_2 \\ \vdots \\ \vdots \\ r_h \end{bmatrix} \quad \text{Expression 2}$$

A column (vertical) vector "v" is an m-dimensional column vector in which the sensor responses $v_i$ (i=1, ..., m) expressing intensity of transmission light passed through a plurality of (m pieces of) filters as elements are arranged in the vertical direction. The vector "v" can be also referred to as a "sensor response vector". For example, in the case of obtaining an image passing through filters of three kinds (R, G, and B) (filter transmission image), the sensor response vector "v" is a three-dimensional column vector (m=3) constructed by three kinds of sensor responses (pixel values) corresponding to the filters.

The column vector "r" is an h-dimensional column vector expressing spectral reflectance (spectral distribution) of an object color and can be also referred to as a "spectral reflectance vector". For example, in the case of making the vector discrete by 31 representative values in increments of 10 nm in the wavelength region of 400 nm to 700 nm of visible light, the spectral reflectance vector "r" is a column vector of the 31st order (h=31) constructed by 31 sensitivities corresponding to the representative values.

Further, a matrix E is a diagonal matrix of h×h expressing a spectral distribution of illumination (in this case, electronic flash light) and can be also referred to as an illumination luminance matrix. The matrix S is a diagonal matrix of h×h expressing total spectral sensitivity of the image capturing system and can be also referred to as an image capturing system sensitivity matrix.

A matrix T is a matrix in which transposed vectors (that is, row vectors $t_i^t$) of m pieces of column vectors $t_i$(h×1) are arranged in the vertical direction and has a size of m rows and h columns (also expressed as m×h) as shown by Expression 3. Each of the m column vectors $t_i$(h×1) is a vector indicative of a spectral characteristic of each filter (each of filters of R, G, and B of the CCD 112). Consequently, the matrix T can be also referred to as a filter spectral characteristic matrix. In the specification, the sign $(*)^t$ denotes a transposed vector or a transposed matrix.

$$T = [t_1, t_2, \ldots, t_m]^t = \begin{bmatrix} t_1^t \\ t_2^t \\ \vdots \\ t_m^t \end{bmatrix} \quad \text{Expression 3}$$

When the matrixes T, E, and S are combined and expressed as a matrix F as shown in Expression 4, the relation between the spectral reflectance vector "r" and the sensor response vector "v" shown in Expression 2 can be expressed as Expression 5. The matrix F has a size of m×h (or can be also expressed as a matrix of (m, h) type).

$$F = TES \quad \text{Expression 4}$$

$$v = Fr (\Leftrightarrow v = TESr) \quad \text{Expression 5}$$

In the digital camera 1, by calculating the spectral reflectance vector "r" on the basis of the sensor response vector "v" for each pixel, object color component data can be acquired. That is, by solving the expression 5 with respect to the spectral reflectance vector "r", the object color component data can be acquired.

In the digital camera 1, however, since the number "h" of dimensions of the spectral reflectance vector "r" is larger than the number "m" of dimensions of the sensor response vector "v" (h>m), the matrix F of the m×h type is not a square matrix nor a nonsingular matrix. Therefore, since an inverse matrix does not exist, Expression 5 cannot be solved with respect to the spectral reflectance vector "r".

Consequently, the spectral reflectance vector "r" is approximately computed by estimation based on various estimating methods.

As approximating methods regarding spectral reflectance, for example, the following two methods can be mentioned. (1) A method of obtaining a relatively small number of basis functions by a principal component analysis and approximating the spectral distribution as linear combination of the basis functions (hereinafter, also referred to as low-dimensional linear approximation method). (2) A method of using multiple linear regression analysis (hereinafter, "multiple regression analysis method").

According to the approximating methods, a spectral distribution can be approximately obtained (or estimated) on the basis of relatively small number of filter transmission light intensities. The method of approximately calculating spectral reflectance by the low-dimensional linear approximation method and the method of approximately calculating spectral reflectance by the multiple linear regression analysis will be described one by one below.

2-1-1. Low-Dimensional Linear Approximation Method

In the low-dimensional linear approximation method, according to an equation 11 to be described later, an estimation value $r_e$ of the spectral reflectance vector "r" is computed from the sensor response vector "v". The outline of the method will be described below.

Generally, the spectral reflectance vector r (h-dimensional vector) can be expressed as Expression 6 as linear combination using the principal component vectors $b_j$ (h-dimensional vector) and a coefficient $w_j$ (scalar) for each of the principal component vectors $b_j$.

$$r = \sum_{j=1}^{k} w_j b_j \quad \text{Expression 6}$$

In such a manner, the spectral reflectance vector "r" is expressed by using the principal component vector $b_j$ (j= 1, ..., K) corresponding to the basis function.

The principal component vector $b_j$ is obtained by a statistical method (principal component analysis). Concretely, the principal component vector $b_j$ is a characteristic vector of a covariance matrix regarding spectral reflectance vectors of a plurality of (K pieces of) samples. Names of a first principal component vector, a second principal component vector, ..., and the j-th principal component vector are given to the obtained plurality of characteristic vectors in order from the largest characteristic value.

In this case, all of the principal component vectors $b_j$ (basis functions) in Expression 6 are not used but "k" principal component vectors $b_j$ (j=1, ..., k) from the first principal component vector to the k-th principal component vector are used, thereby approximately expressing the spectral reflectance vector "r". That is, as shown by Expression 7, the spectral reflectance vector "r" is approximated with an approximate spectral reflectance vector (in other words, estimated spectral reflectance vector) $r_e$.

$$r \cong r_e \quad \text{Expression 7}$$

The approximate spectral reflectance vector $r_e$ is also expressed by Expression 8.

$$r = \sum_{j=1}^{k} w_j b_j \quad \text{Expression 8}$$
$$= Bw$$
$$= [b_1, b_2, \ldots, b_k]w$$
$$= \begin{bmatrix} b_{11} & b_{12} & \cdots & b_{1k} \\ b_{21} & b_{22} & \cdots & b_{2k} \\ \vdots & \vdots & \ddots & \vdots \\ b_{h1} & b_{h2} & \cdots & b_{hk} \end{bmatrix} \begin{bmatrix} w_1 \\ w_2 \\ \vdots \\ w_k \end{bmatrix}$$

A matrix B is a matrix in which k pieces of principal component vectors (column vectors) $b_j$ are arranged in the lateral direction and has a size of h×k. A coefficient vector w is a k-dimensional vector in which k coefficients $w_j$ (j=1, ..., k) are arranged in the vertical direction as elements. The number k of dimensions is set as the same value as the number m of dimensions of the sensor response vector v (k=m) for convenience of calculation to be described later. In short, the number "k" of principal component vectors is set so as to be equal to the number "m" of filters (also referred to as the number of wavelength regions).

At this time, the relation of Expression 9 is derived by using Expressions 5, 7, and 8.

$$v = Fr \cong Fr_e FBw \quad \text{Expression 9}$$

where the matrix (FB) of (m×k) is a square matrix of (m×m) because k is equal to m. If the matrix (FB) is regular, the matrix (FB) has an inverse matrix. In this case, the coefficient vector "w" is expressed by Expression 10 by using an inverse matrix $(FB)^{-1}$ of the matrix (FB).

$$w \cong (FB)^{-1} v \quad \text{Expression 10}$$

Therefore, the approximate spectral reflectance vector $r_e$ is expressed as Expression 11. Expression 11 is derived by substituting Expression 10 for Expression 8.

$$r_e \cong B(FB)^{-1} v \quad \text{Expression 11}$$
$$= Dv \quad (\text{where } D = B(FB)^{-1})$$

Since elements of the matrix F (=TES) and the matrix B are known (determined by initial settings), by using Expression 11, the approximate spectral reflectance vector $r_e$ as an estimation value of the spectral reflectance vector r can be obtained on the basis of the sensor response vector v.

In the following description, the approximate spectral reflectance vector $r_e$ is described as the spectral reflectance "r" of a subject (an object to be image-captured).

To increase precision of estimation (approximation) of spectral reflectance, it is preferable to use the principal component vector $b_j$ (j=1, ..., k) in accordance with the kind of a subject (for example, a painted object, a water-color painting, and the like). In the following description, therefore, it is assumed that in the digital camera 1, data of the principal component vector $b_j$ according to the kind of a subject (also referred to as "principal component vector data") is pre-stored in the ROM 22 or the like and, according to a mode setting made by the user, the principal component vector $b_j$ is selected according to the mode setting made by the user.

2-1-2. Multiple Linear Regression Analysis

In the multiple linear regression analysis, based on Expression 15 which will be shown later, an estimation value $r_e$ of the spectral reflectance vector r is derived from the sensor response vector v. The outline will be described below.

To estimate the spectral reflectance, the multiple linear regression analysis is applied. As the multiple linear regression analysis, a singular value decomposition method will be used. In such a manner, a value can be easily obtained by vector and matrix arithmetic operation.

First, a matrix R having a size of (h×n) as shown in Expression 12 in which "n" spectral reflectance vectors (column vectors) $r_1, \ldots, r_n$ indicative of calorimetric values are arranged in the horizontal direction is obtained. Each of the vectors $r_1, \ldots, r_n$ is an h-dimensional vector indicative of a calorimetric value for each of "n" samples.

$$R = [r_1, r_2, \ldots, r_n] \quad \text{Expression 12}$$
$$= \begin{bmatrix} r_{11} & r_{12} & \cdots & r_{1n} \\ r_{21} & r_{22} & \cdots & r_{2n} \\ \vdots & \vdots & \ddots & \vdots \\ r_{h1} & r_{h2} & \cdots & r_{hn} \end{bmatrix} : (h, n) \text{matrix}$$

A matrix V having a size of (m×n) as shown in Expression 13 in which "n" sensor response vectors (column vectors) $v_1, \ldots, v_n$ are arranged in the horizontal direction is obtained. Each of the vectors $v_1, \ldots, v_n$ is an m-dimensional vector and corresponds to each of the spectral reflectance vectors (column vectors) $r_1, \ldots, r_n$.

$$V = [v_1, v_2, \ldots, v_n] \quad \text{Expression 13}$$
$$= \begin{bmatrix} v_{11} & v_{12} & \cdots & v_{1n} \\ v_{21} & v_{22} & \cdots & v_{2n} \\ \vdots & \vdots & \ddots & \vdots \\ v_{m1} & v_{m2} & \cdots & v_{mn} \end{bmatrix} : (m, n) \text{matrix}$$

A regression coefficient matrix G of a regression expression from V as an explanatory variable to R as a criterion variable is expressed by Expression 14. The regression theory is expansion to the case of a multivariable of the least square method. The size of the matrix G is (h×m).

$$G = RV^t(VV^t)^{-1} \quad \text{Expression 14}$$

Therefore, by using the regression coefficient matrix G as an estimation matrix as shown by Expression 15, the estimation value of the spectral reflectance vector r, that is, the approximate spectral reflectance vector $r_e$ can be obtained from the sensor response vector v.

$$r_e = Gv \quad \text{Expression 15}$$

Although the sensor response vectors $v_1, \ldots, v_n$ of each of n samples can be obtained by sequentially switching the n samples in practice, they can be obtained by simulation by using Expression 2 and it is effective for laborsaving. Concretely, in Expression 2, the matrix S is a matrix peculiar to an apparatus, and the matrixes T and E are determined based on the RGB filter characteristics and the electronic flash light characteristics. In Expression 2, all of the spectral reflectance vectors $r_1, \ldots, r_n$ are known by using spectral reflectance values actually measured with respect to the n samples in advance. Therefore, since all of the values except for the sensor response vector v are known in Expression 2, n sensor response vectors $v_1, \ldots, v_n$ can be calculated by simulation by using Expression 2. In the following description, it is assumed that in the digital camera 1, data of the spectral reflectance vectors $r_1, \ldots, r_n$ for simulation (hereinafter, also referred to as "spectral reflectance sample data") is stored in the ROM 22 or the like in advance and "n" sensor response vectors $v_1, \ldots, v_n$ are calculated by simulation.

In the multiple regression method, a case where the explanatory variable and the criterion variable have a linear relation is assumed. However, a case where the explanatory variable and the criterion variable have a nonlinear relation is also assumed. In such a case, it is also possible to introduce a term of the high order of the explanatory variable, concretely, a term of the high order of sensor response and estimate spectral reflectance. By this method, estimation precision in Expression 15 can be improved.

For example, as each of the sensor response vectors $v_u$ (u=1, ..., n) included in Expression 13, an expanded vector $v_u$ including the term of the high order as shown by Expression 16 is assumed. The order of the expanded vector is higher than the order m of an original vector. A value $v_{iu}$ is a scalar amount indicative of the i-th component (i=1, ..., m) of the original vector $v_u$ of Expression 13.

$$v_u = \begin{bmatrix} v_{1u} \\ v_{2u} \\ v_{3u} \\ \vdots \\ v_{mu} \\ v_{1u} \times v_{1u} \\ v_{1u} \times v_{2u} \\ \vdots \\ v_{mu} \times v_{mu} \end{bmatrix} \qquad \text{Expression 16}$$

The expanded sensor response vector $v_u$ including the term of the high order is used in place of the sensor response vector v and, in a manner similar to the above case (the case in which a term of the high order is not used), the approximate spectral reflectance vector $r_e$ is obtained. Concretely, an expanded matrix V for the expanded vector $v_u$ is calculated on the basis of Expression 13, an expanded matrix G is computed on the basis of Expression 14, and the approximate spectral reflectance vector $r_e$ for the expanded vector $v_u$ is computed on the basis of Expression 15. This case differs from the above case with respect to the point that the size of the expanded vector $v_u$ and the size of the expanded matrix V are different from that of the original vector v and that of the matrix V, respectively. Although Expression 16 includes up to the term of the second order, it may include a term of a higher order (the third or higher order).

2-2. Principle of Estimating Spectral Distribution of Unknown Illumination

The principle of estimating the spectral distribution of unknown illumination by using first object color component data and second color image data will now be described.

In Expression 2, what is unknown is only the spectral distribution of unknown illumination. Specifically, elements T and S are known (determined in initial settings of elements), r is computed by the principle 1 of computing the spectral reflectance, and v is obtained from the second color image data.

When the matrixes T, r, and S in Expression 2 are expressed as a matrix M as shown in Expression 17, the relation between the spectral distribution E of illumination shown in Expression 2 and the sensor response vector v can be expressed as Expression 18. The matrix M has a size of m×h.

$$M = TrS \qquad \text{Expression 17}$$

$$v = ME \qquad \text{Expression 18}$$

In Expressions 17 and 18, E denotes an h-dimensional column vector (spectral distribution vector) expressing the spectral distribution of illumination, and r indicates a diagonal matrix of h×h expressing the spectral reflectance (spectral distribution). In a manner similar to the above, v denotes an m-dimensional column (vertical) vector, the matrix T is a matrix having a size of m rows and h columns as shown in Expression 3, and the matrix S is a diagonal matrix of h×h expressing total spectral sensitivity of an image capturing system.

By solving Expression 18 with respect to the spectral distribution vector E, the spectral distribution of unknown illumination can be computed. As the method of solving Expression 18 with respect to the spectral distribution vector E, a method similar to the method of solving Expression 5 with respect to the spectral reflectance vector r can be used. That is, the spectral distribution of unknown illumination can be approximately calculated by the above-described low-dimensional linear approximation method and the multiple linear regression analysis. However, in the case where the unknown illumination is a fluorescent lamp or the like and its spectral distribution includes an emission line, the low-dimensional linear approximation method using only three principal component vectors cannot estimate the spectral distribution of unknown illumination including an emission line with high precision. The spectral distribution of the unknown illumination can be estimated more precisely by the multiple linear regression analysis.

Also in the multiple linear regression analysis for estimating the spectral distribution of unknown illumination, by using simulation in a manner similar to the multiple linear regression analysis for estimating the spectral reflectance vector "r", laborsaving can be achieved. Concretely, the matrixes T, r, and S, that is, the matrix M are known. When spectral distributions actually measured in advance of n sample illuminations are used as the spectral distributions of n illuminations, all of the values except for the sensor response vector v in Expression 18 are known, so that the n sensor response vectors $v_i, \ldots, v_n$ can be calculated by simulation. In the following description, it is assumed that in the digital camera 1, data of n spectral distribution vectors $E_1, \ldots, E_n$ for simulation (hereinafter, also referred to as "spectral distribution sample data") is pre-stored in the ROM 22 or the like and the n sensor response vectors $v_1, \ldots, v_n$ are calculated by simulation.

2-3. Method of Calculating Conversion Matrix

A conversion matrix is a matrix for computing the estimation value $r_e$ of the spectral reflectance vector r from the sensor response vector v. D in Expression 11 related to the low-dimensional linear approximation method and G in Expression 15 related to the multiple linear regression analysis method correspond to the conversion matrix. That is, the matrix D or matrix G are calculated as a conversion matrix.

For example, by using the spectral distribution E of unknown illumination computed as described above, the elements of the matrix F (=TES) and the matrix B are known, so that the matrix D can be calculated.

On the other hand, the matrix G can be calculated by solving Expression 14 by using the sensor response vectors $v_1, \ldots, v_n$ of the n samples whose spectral reflectance is known. Concretely, in Expression 2, the matrix S is a matrix peculiar to the apparatus, the matrix T is determined by the RGB filter characteristics, and the matrix E is the spectral distributions of unknown illuminations as described above. Further, by using the spectral reflectance actually measured of the n samples in advance for the spectral reflectance vectors $r_1, \ldots, r_n$, all of the elements in Expression 2 except for the sensor response vector v are known. Therefore, n sensor response vectors $v_1, \ldots, v_n$ can be calculated by simulation. By using the n spectral reflectance vectors $r_1, \ldots r_n$ and n sensor response vectors $v_1, \ldots, v_n$, Expression 14 is solved and the matrix G can be calculated.

2-4. Principle 2 of Computing Spectral Reflectance of Subject

By the method of calculating the conversion matrix, the matrix D in Expression 11 or the matrix G in Expression 15 is known. Therefore, the subjects are changed and the n-th color image data of the n-th subject is obtained by image capture in an unknown illumination environment. Only by substituting the m-dimensional sensor response vector v based on the n-th color image data for Expression 11 or 15, the estimation value of the spectral reflectance of the n-th subject can be calculated. That is, the object color component data of the n-th subject can be estimated.

2-5. Generation of Color Reproduction Image

The object color component data obtained according to the principle 2 of computing the spectral reflectance of the subject is information regarding the spectral distribution of an object color in each pixel and does not depend on the spectral distribution of an illumination light source. Therefore, based on the spectral distribution of the object color in each pixel and the spectral distribution of an arbitrary illumination light source, color image data under the illumination light source can be easily generated (irrespective of whether image capture is performed or not under the illumination light source).

Concretely, for example, the spectral reflectance vector r of the subject is known in Expression 5. By arbitrarily determining the spectral distribution of an illumination light source, all of the values on the right side of Expression 5 are known, and the sensor response vector v can be calculated. By using the principle, in the digital camera 1, a plurality of pieces of data regarding the spectral distribution of the arbitrary illumination light source are stored in the ROM 22 or the like, and color image data under the arbitrary illumination light source is generated in accordance with selection of the user.

Generally, in the case of output color image data so as to be visible on a display, the data has to be outputted in a data format such as 8-bit RGB data adapted to the display or the like. The digital camera 1 converts the color image data into an arbitrary data format according to selection of the user or the like, thereby generating color reproduction image data. The conversion of the data format includes conversion of a file format (for example, JPEG format, BMP format, TIFF format, or the like) of image data.

3. Operation in Object Color Acquiring Mode of Digital Camera 1

An image capturing operation in the object color acquiring mode will now be described in detail with reference to the flowcharts shown in FIGS. 5 to 10. First, when the digital camera 1 is set in the object color acquiring mode, an image capturing operation in the object color acquiring mode is started and the program advances to step S11 in FIG. 5.

In the object color acquiring mode, spectral reflectance is computed for each pixel, and the spectral distribution of unknown illumination can be estimated in correspondence with each pixel. Consequently, if an image capture with electronic flash light and an image capture without light emission of the built-in electronic flash 121 (hereinafter, also referred to as "normal image capture") are not performed with the same picture composition for the first subject, the spectral distribution of illumination cannot be accurately computed. As shown in FIGS. 11, 12, 13A and 13B, for example, it is necessary to fix the digital camera 1 by a fixing member such as a tripod 80 and perform the image capture with electronic flash and the normal image capture without changing the position of a first subject SS while maintaining the picture composition.

In the case where stationary light emitted to the first subject is not uniform in space and changes gradually on the first subject in the space, a conversion matrix is calculated for each pixel (which will be described later). In such a case, the positional relation between the digital camera 1 and stationary light has to be prevented from being changed also at the time of capturing image while sequentially changing subjects in order to estimate object color component data of each subject with high precision. That is, also at the time of obtaining the n-th color image data of the n-th subject by capturing an image thereof while sequentially changing subjects, the digital camera 1 has to be fixed by the tripod 80 or the like. In the following description of the image capturing operation in the object color acquiring mode, it is assumed that the digital camera 1 is fixed by the tripod 80 or the like. A broken line in each of FIGS. 11, 12, 13A and 13B expresses a range which is an object domain for image capturing by the digital camera 1 (hereinafter, also referred to as "image capture range").

In step S11, whether the shutter start button 122 is depressed or not is determined. In this step, if the shutter start button 122 is depressed, the program advances to step S12. If the shutter start button 122 is not depressed, determination in step S11 is repeated. Depression of the shutter start button 122 as an object of determination in step S11 is an instruction from the user for capturing an image of a first subject with electronic flash light. Therefore, the user disposes the first subject as a reference in the image capture range of the digital camera 1 in an environment where the subject is irradiated with stationary light UL whose spectral distribution is not known in advance (unknown illumination environment), and depresses the shutter start button 122. In order to estimate the spectral distribution of the unknown illumination accurately, the first subject should not be a transparent object or an object whose surface has metallic luster. The first subject is, preferably, a flat-plate-shaped object which can be disposed so that its flat surface faces the digital camera 1 and so as not to have a shape which is not properly irradiated with the unknown illumination.

In step S12, an operation of estimating object color component data of the first subject (hereinafter, also referred to as "object color estimation 1") is performed. After that, the program advances to step S13.

The operation of the object color estimation 1 will now be described.

Figure 6:
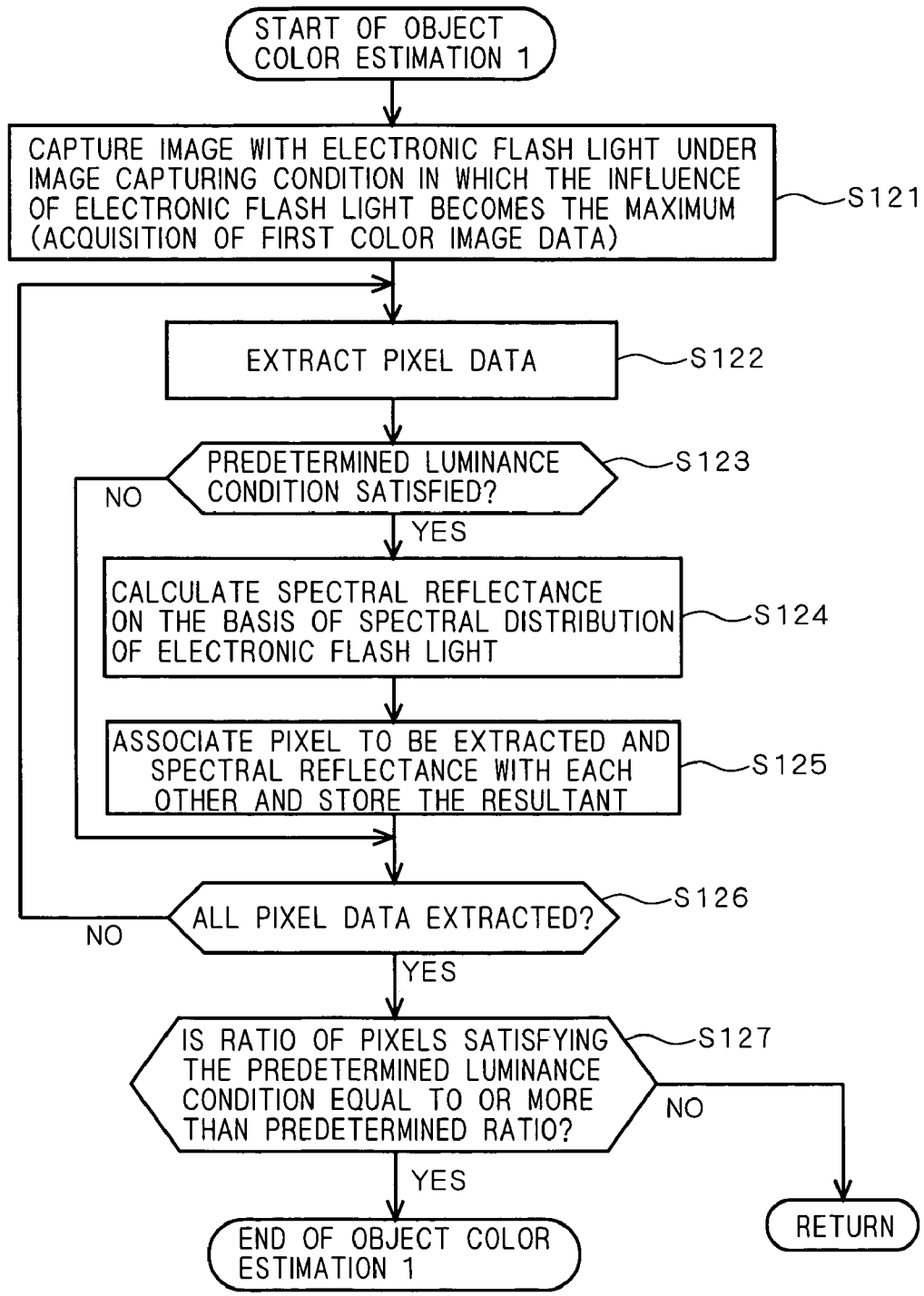
FIG. 6 is a flowchart showing a flow of the image capturing operation in the object color acquiring mode.

FIG. 14 is a block diagram showing, together with other configurations, the configuration of functions realized by the CPU 21, ROM 22, and RAM 23 mainly in the object color estimation 1, and FIG. 6 is a flowchart showing the operation flow of the object color estimation 1. In the configuration shown in FIG. 14, a pixel data extracting part 202, a luminance determining part 203, an object color component data generating part 204, and a pixel number determining part 205 are functions realized by the CPU 21, RAM 23, and the like when the program 221 or the like stored in the ROM 22 is read by the CPU 21. The operation of the object color estimation 1 will be described with reference to the drawings.

Step S12 in FIG. 5 has a subroutine of FIG. 6.

In step S121, image-capturing is performed with electronic flash light by image capturing parameters so that the influence of electronic flash light becomes the maximum. After that, the program advances to step S122. Specifically, as shown in FIG. 11, the first subject as a reference is disposed in the image capture range of the digital camera 1 in the unknown illumination environment. As shown in FIG. 12, image-capturing is carried out by illuminating the first subject with electronic flash light FL (corresponding to the range sandwiched by alternate long and short dash lines).

In step S121, the exposure parameters are set in such a manner that the aperture value is the maximum (the aperture diameter of the diaphragm is the minimum) and shutter speed is the highest irrespective of brightness of the subject so that the influence of electronic flash light becomes the maximum. With the set exposure parameters (aperture value: maximum, and shutter speed: highest), image data of the first subject irradiated with the electronic flash light (first color image data) is acquired. To be specific, the built-in electronic flash 121 emits light, an image signal is acquired by the CCD 112, and the acquired image signal is transmitted from the A/D converter 115 to the RAM 23 and stored as first color image data 231. Image data of the subject sufficiently irradiated with electronic flash light because of the exposure parameters by which the influence of electronic flash light becomes the maximum can be regarded as image data acquired by using only electronic flash light as illumination light (influenced only by the light emission illumination environment).

In step S122, one-pixel data is extracted from the first color image data 231, and the program advances to step S123. In the step S122, each time the program returns from step S126 which will be described later, one-pixel data which is not yet extracted is extracted from the first color image data 231 by the pixel data extracting part 202.

In step S123, whether the pixel data (pixel value) extracted in step S122 satisfies a predetermined luminance condition or not is determined. If the pixel data satisfies the predetermined luminance condition, the program advances to step S124. If not, the program advances to step S126. The determination is made to see whether the subject is sufficiently irradiated with electronic flash light or not for each of the pixels. For example, in the case of expressing a pixel value in eight bits, a pixel having a pixel value of a predetermined value (for example, 80) or larger is determined that pixel data satisfies the predetermined illumination conditions by a luminance determining part 203. In such a manner, pixel data satisfying the predetermined luminance conditions is detected from the pixel data of the first color image data.

In step S124, spectral reflectance is calculated on the basis of the pixel data extracted in step S122 and the spectral distribution of electronic flash light, and the program advances to step S125. The pixel data determined in step S123 that it satisfies the predetermined luminance conditions can be regarded as pixel data acquired by using only the electronic flash light as illumination light. Consequently, in step S124, by the object color component data generating part 204, the spectral reflectance is calculated on the basis of a spectral distribution of electronic flash light (hereinafter, also referred to as "electronic flash spectral data") 234 and the pixel data in accordance with the "principle 1 of obtaining spectral reflectance". The electronic flash spectral data can be acquired in advance by measurement and is pre-stored in the ROM 22 or the like. At the time of using the electronic flash spectral data for computation, it is stored as the electronic flash spectral data 234 in the RAM 23. Necessary various data (data related to image capturing system total spectral sensitivity $S(\lambda)$, spectral transmittance $t_r(\lambda)$, and the like) is preliminarily stored in the ROM 22 or the like and, as necessary, read to the CPU 21, RAM 23, or the like.

The electronic flash spectral data slightly changes according to the light emission conditions of the electronic flash, and the light emission conditions are determined in the digital camera 1. Consequently, according to the light emission conditions, the electronic flash spectral data may be corrected or optimum electronic flash spectral data can be read from a table or the like. For example, it is possible to store spectral distributions of electronic flash light under detailed light emission conditions as a database in the ROM 22 and determine the spectral distribution of electronic flash light on the basis of the light emission state of the built-in electronic flash 121. Concretely, a database as shown in Table 1 (hereinafter, also referred to as "electronic flash DB") is stored in the ROM 22. On the basis of the light emission state of the built-in electronic flash 121 obtained from the electronic flash control circuit 121$a$, the optimum spectral distribution of electronic flash light can be determined from the electronic flash DB.

TABLE 1

|    | Charge voltage (V) | Light emission time | \multicolumn{6}{c}{Wavelength (nm)} |||||||
|    |      |      | 400  | 420  | 440  | ... | 460  | 680  | 700  |
|----|------|------|------|------|------|-----|------|------|------|
| 1  | 330  | 1    | 0.1  | 0.2  | 0.4  | ... | 0.5  | 0.7  | 0.65 |
| 2  | 330  | ½    | 0.1  | 0.22 | 0.43 | ... | 0.55 | 0.68 | 0.62 |
| 3  | 330  | ¼    | 0.1  | 0.23 | 0.44 | ... | 0.57 | 0.65 | 0.61 |
| 4  | 330  | ⅛    | 0.13 | 0.26 | 0.48 | ... | 0.59 | 0.63 | 0.6  |
| .  | .    | .    | .    | .    | .    |     | .    | .    | .    |
| 21 | 290  | 1    | 0.1  | 0.3  | 0.45 | ... | 0.57 | 0.7  | 0.65 |
| 22 | 290  | ½    | 0.1  | 0.31 | 0.48 | ... | 0.59 | 0.71 | 0.68 |
| 23 | 290  | ¼    | 0.1  | 0.33 | 0.51 | ... | 0.6  | 0.76 | 0.73 |
| 24 | 290  | ⅛    | 0.1  | 0.35 | 0.55 | ... | 0.63 | 0.78 | 0.71 |
| .  | .    | .    | .    | .    | .    |     | .    | .    | .    |
| 41 | 250  | 1    | 0.1  | 0.33 | 0.58 | ... | 0.54 | 0.68 | 0.62 |
| 42 | 250  | ½    | 0.1  | 0.35 | 0.6  | ... | 0.53 | 0.69 | 0.6  |

For example, in the case where the charge voltage is 325V and the light emission time is 1/5, a spectral distribution of electronic flash light in the closest light emission conditions of the charge voltage of 330V and the light emission time of 1/4 is determined as an actual spectral distribution.

In step S125, the position of the pixel extracted in step S122 (generally, information for specifying a pixel) and the spectral reflectance calculated in step S124 are associated with each other and stored. After that, the program advances to step S126. In the step S125, for example, the object color component data generating part 204 acquires the information of the position of the pixel extracted by the pixel data extracting part 202, thereby associating the position of the pixel and the spectral reflectance with each other and storing them into the RAM 23. When all of the pixels are extracted by the pixel data extracting part 202 and the processes in steps S123 to S125 are performed on all of the pixels, object color component data (first object color component data) 235 of the first subject in which the position of each pixel and the spectral reflectance are associated with each other is generated in the RAM 23.

In step S126, whether all of pixel data has been extracted in step S122 or not is determined. In the step S126, whether pixel data is extracted or not is managed by the pixel data extracting part 202. If extraction of all of pixel data in the first color image data 231 has been completed, the program advances to step S127. If not, the program returns to step S122.

In step S127, whether the ratio of the pixels determined as pixels satisfying the predetermined luminance condition in step S123 in all of the pixels is equal to a predetermined ratio (for example, 1/10) or higher is determined. If spectral reflectance of pixels at a certain ratio cannot be estimated, precision of estimation of the spectral distribution of illumination to be estimated later deteriorates. Consequently, in the step S127, whether object color component data which can be used for estimating a spectral distribution of illumination is obtained or not is determined. The determination in the step S127 can be realized by, for example, counting the number of pixels of the first object color component data and comparing the counted number with the total number of pixels (the number of pixels preliminarily determined by the CCD 112) by the pixel number determining part 205. In the case where it is determined that the ratio of the pixels determined as pixels satisfying the predetermined luminance condition is equal to or higher than the predetermined ratio in all of pixels, the first object color component data 235 is employed as object color component data of the first subject, and the operation of the object color estimation 1 is finished. On the other hand, in the case where the ratio is lower than the predetermined ratio, the first object color component data 235 is eliminated, and the program returns to the beginning of the image capturing operation in the object color acquiring mode, that is, step S11 in FIG. 5.

In such a manner, in the digital camera 1, by the operation of the object color estimation 1, the first object color component data of the first subject can be estimated by using the first color image data of the first subject. When the operation of the object color estimation 1 is finished, the program advances to step S13 in FIG. 5.

In step S13, an operation of estimating the spectral distribution of unknown illumination (hereinafter, also referred to as "estimation of a spectral distribution of illumination") is performed. After that, the program advances to step S14.

The operation of estimating the spectral distribution of illumination will now be described.

Figure 7:
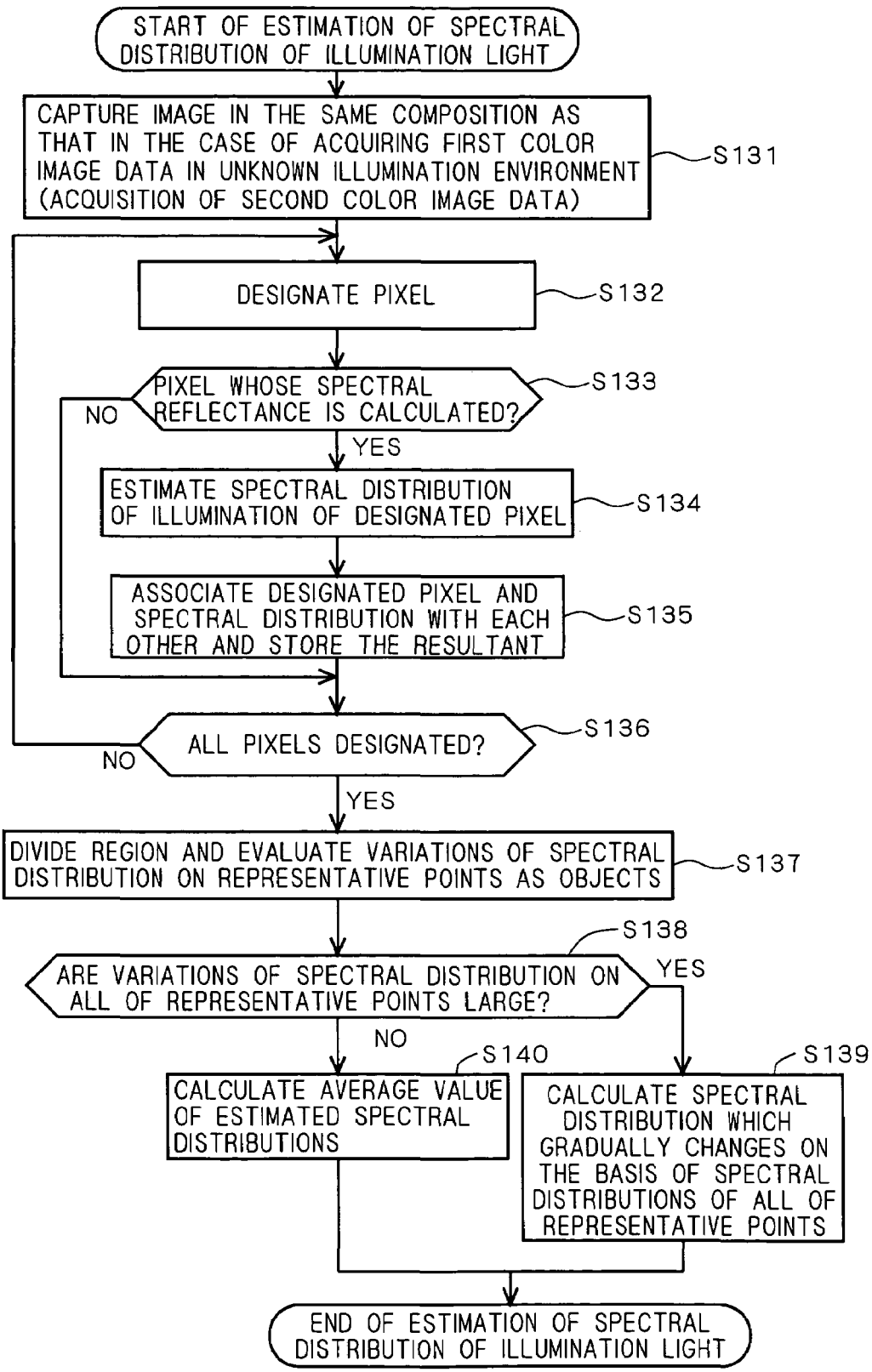
FIG. 7 is a flowchart showing a flow of the image capturing operation in the object color acquiring mode.

FIG. 15 is a block diagram showing the configuration of functions realized by the CPU 21, ROM 22, and RAM 23 mainly in the estimation of the spectral distribution of illumination together with the other configuration. FIG. 7 is a flowchart showing the flow of the operation of estimating the spectral distribution of illumination. In the configuration of FIG. 15, a pixel designating part 206, a designated pixel determining part 207, a first illumination spectral data generating part 208, a variation determining part 209, and a second illumination spectral data generating part 210 are functions realized by the CPU 21, RAM 23, and the like when the program 221 or the like stored in the ROM 22 is read by the CPU 21. The operation of estimating the spectral distribution of light will be described below with reference to the drawings.

Step S13 in FIG. 5 has a subroutine of FIG. 7.

In step S131, in the unknown illumination environment, normal image-capturing is performed in a picture composition similar to that used at the time of acquiring first color image data. After that, the program advances to step S132. Specifically, as shown in FIG. 11, while holding the picture composition by maintaining the same positions of the digital camera 1 and the first subject as those of the case where image-capturing is performed with electronic flash in the object color estimation 1, image-capturing is performed without light emission of the built-in electronic flash 121, thereby acquiring image data of the first subject irradiated with stationary light (second color image data). Therefore, an image signal is obtained by the CCD 112, and the acquired image signal is transmitted from the A/D converter 115 to the RAM 23 and stored as second color image data 232 influenced by only the stationary illumination environment.

In step S132, one pixel out of all of the pixels of the second color image data 232 is designated by the pixel data designating part 206 and, after that, the program advances to step S133. In step S132, each time the routine returns from step S136 which will be described later, one pixel which has not been designated yet out of the pixels of the second color image data 232 is designated by the pixel data designating part 206.

In step S133, whether the pixel designated in step S132 corresponds to a pixel of which spectral reflectance has been calculated in the object color estimation 1 in step S12 or not is determined. In step S133, if it is determined that the designated pixel corresponds to the pixel of which spectral reflectance has been calculated in step S12, the program advances to step S134. If it is determined that the designated pixel does not correspond to the pixel of which spectral reflectance has been calculated, the program advances to step S136. The determination can be realized when the designated pixel determining part 207 refers to the first object color component data 235 stored in the RAM 23.

In step S134, the spectral distribution of illumination of the designated pixel is estimated and, after that, the program advances to step S135. In step S134, the spectral distribution of unknown illumination is calculated by using pixel data of the designated pixel in the second color image data and the spectral reflectance corresponding to the designated pixel in the first object color component data in accordance with the "principle of estimating the spectral distribution of unknown illumination" by the first illumination spectral data generating part 208. In the principle of spectral distribution estimating of unknown illumination, necessary various data (data regarding image capturing system total spectral sensitivity $S(\lambda)$, spectral transmittance $t_i(\lambda)$, and the like) is pre-stored in the ROM 22 or the like and, as necessary, read to the CPU 21, RAM 23, or the like.

In step S135, the pixel designated in step S132 and the spectral distribution of unknown illumination calculated in step S134 are associated with each other and stored. After that, the program advances to step S136. In step S135, for example, the first illumination spectral data generating part 208 acquires information of the position of the pixel designated by the pixel designating part 206, thereby associating the position of the designated pixel and the spectral distribution of the unknown illumination with each other and storing them in the RAM 23. When all of pixels are designated by the pixel designating part 206 and the processes of steps S133 to S135 are performed on all of the pixels, data 236 of the spectral distribution of unknown illumination (hereinafter, "illumination spectral data") of each pixel in which each pixel and the spectral distribution of each unknown illumination are associated with each other is generated in the RAM 23.

In step S136, whether all of pixels are designated in step S132 or not is determined. In step S136, designation of pixels is managed by the pixel designating part 206. If designation of all of pixel data is finished, the program advances to step S137. If not, the program returns to step S132.

Figures 16, 17:
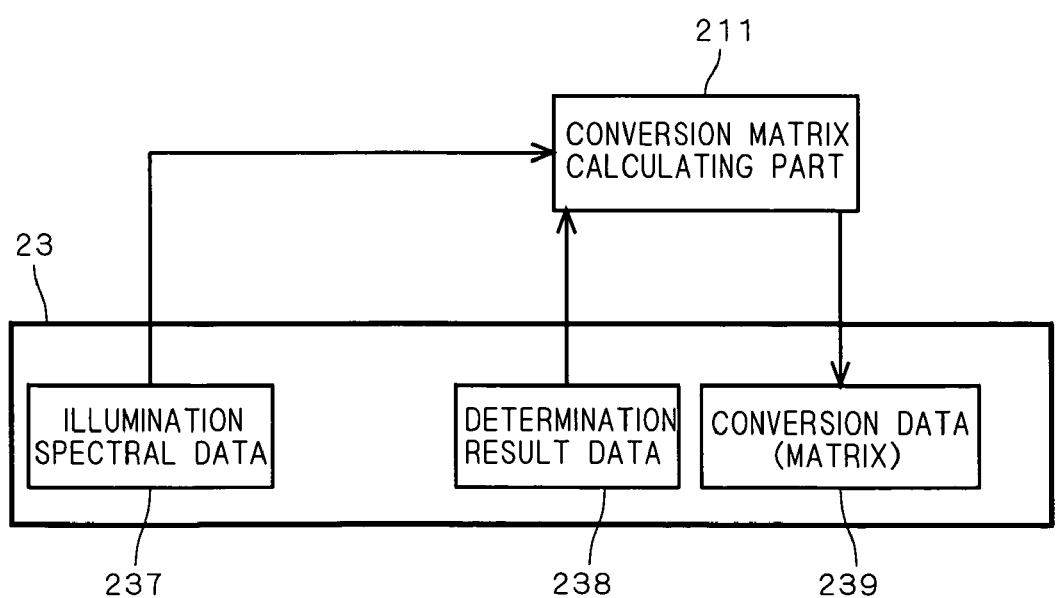
FIG. 16 is a diagram illustrating region division of a pixel array.
FIG. 17 is a block diagram showing functions related to operation of calculating a conversion matrix.

In step S137, a pixel array G of all of pixels of the CCD 112 is divided into a plurality of regions (for example, three in the vertical direction×four in the horizontal direction=total 12 lattice regions). A representative point (for example, the center point) in each region is set as an object and variations of the spectral distribution of unknown illumination are evaluated. The program advances to step S138. In the step S137, for example, the pixel array G is divided into 12 regions (also referred to as "divided regions") A1 to A12 having equal areas of three regions in the vertical direction by four regions in the vertical direction as shown in FIG. 16. Based on data of the spectral distribution corresponding to the pixel positioned in the center of the divided regions A1 to A12 (hereinafter, also referred to as "region center pixel") in the illumination spectral data of each pixel generated in steps S134 and S135, variations of the spectral distribution of unknown illumination are evaluated. Concretely, the variation determining part 209 extracts data of the spectral distribution corresponding to each region center pixel from the illumination spectral data 236 of each pixel and evaluates variations in the spectral distribution of unknown illumination.

As described above, the spectral distribution of unknown illumination is not calculated for all of the pixels. In step S137, for example, only in the case where all of spectral distributions of unknown illumination corresponding to 12 region center pixels are calculated, variation evaluation is made.

For example, in the case where an integral value of mean square errors among the spectral distributions of unknown illumination corresponding to the region center pixels is equal to or larger than a predetermined value, it is determined that variations in the spectral distribution are large, and determination result data 238 is stored in the RAM 23. Considering the tendency that pixels are sensed darker with distance from the center (so-called shading), for example, the variation determining part 209 makes correction of performing a multiplication by K times on the spectral distributions corresponding to the region center pixels so that values of green light having a wavelength of around 500 nm become similar to each other and, after that, calculates an integral value of the mean square errors. If the spectral distributions of the representative points are largely different from each other, that is, if the spectral distributions of emission light are largely different from each other according to places, the integral value of the mean square errors becomes equal to or larger than a predetermined value.

In step S138, whether variations of the spectral distributions are large or not are determined with respect to all of the representative points. In the step S138, when the spectral distributions corresponding to all of representative points are obtained in step S137 and the variation determining part 209 determines that the variations of the spectral distributions are large, the program advances to step S139. On the other hand, when the spectral distributions corresponding to the representative points as a part are not obtained or when it is not determined that variations of the spectral distribution are large in step S137, the program advances to step S140.

In step S139, based on the spectral distributions of unknown illumination of all of representative points of the illumination spectral data 236 of each pixel, a spectral distribution (hereinafter, also referred to as "illumination spectral data") 237 of unknown illumination which gradually changes among pixels is calculated and stored in the RAM 23, and an operation of estimating the spectral distribution of illumination is finished. In the step S139, on the basis of the determination result data 238, the second illumination spectral data generating part 210 determines that the first subject is irradiated with, not unknown illumination uniformly in space, but light having spectral distributions which differ according to places. The second illumination spectral data generating part 210 performs an operation of generating the illumination spectral data 237 in which the spectral distribution of unknown illumination gradually changes among pixels. That is, the second illumination spectral data generating part 210 generates the illumination spectral data 237 on the basis of the illumination spectral data 236 of each pixel. Concretely, based on the spectral distributions of unknown illumination corresponding to representative points, the spectral distribution of unknown illumination is calculated with respect to all of the pixels so that the spectral distribution changes almost linearly among the representative points. Since the peripheral portion of the pixel array G does not exist among the representative points, it can be calculated by extrapolation on the basis of a change (gradient) of the spectral distribution of unknown illumination among the representative points.

Although the spectral distribution of unknown illumination which gradually changes among pixels is calculated on the basis of the spectral distributions of unknown illumination at the representative points, the present invention is not limited to the case. For example, in the case where the illumination spectral data 236 of each pixel is calculated with respect to all of the pixels of the pixel array G, the second illumination spectral data generating part 210 may employ the illumination spectral data 236 of each pixel as it is as the illumination spectral data 237. In some cases, the configuration is more preferable since the calculation amount can be made smaller and the estimation precision of the illumination spectral data 237 is higher as compared with the above-described configuration.

In such a manner, in correspondence with the case where the subject is not irradiated with unknown illumination uniformly in space, the illumination spectral data 237 in which the spectral distribution of illumination gradually changes among pixels can be estimated.

In step S140, an average value of the illumination spectral data 236 of pixels estimated in steps S134 and S135 is calculated, and the operation of estimating the spectral distribution of illumination light is finished. In the case where it is determined in step S137 that variations in the spectral distribution are not large, it can be determined that the whole first subject is irradiated with stationary light which is almost uniform in space. In the case where it is determined in step S137 that spectral distributions corresponding to representative points in a part are not obtained, if the spectral distribution of unknown illumination which gradually changes among pixels is obtained, estimation precision of the illumination spectral data 237 decreases. Consequently, in the preferred embodiment, in the case where it is determined in step S137 that the spectral distributions of unknown illumination corresponding to the representative points in a part are not obtained, processing is performed on assumption that the whole first subject is irradiated with stationary light which is uniform in space for convenience. Therefore, in step S140, also for the purpose of simplifying following calculations, an average value of the illumination spectral data 236 of each pixel (concretely, the spectral distribution of unknown illumination of each pixel) is calculated by the second illumination spectral data generating part 210 and stored as the illumination spectral data 237 corresponding to all of the pixels in the pixel array G into the RAM 23. By such processes, in step S12, even in the case where only the spectral reflectance of a portion of the first subject, which is sufficiently irradiated with electronic flash light is obtained, the illumination spectral data 237 corresponding to all of the pixels in the pixel array G can be estimated.

In such a manner, in the digital camera 1, on the basis of the second color image data of the first subject obtained in the unknown illumination environment and the first object color component data, the spectral distribution of unknown illumination can be estimated. When the operation of estimating the spectral distribution of illumination light is finished, the program advances to step S14 in FIG. 5.

In step S14, an operation of calculating a conversion matrix for converting color image data obtained in the unknown illumination environment to object color component data (hereinafter, also referred to as "calculation of a conversion matrix") is performed. After that, the program advances to step S15.

The operation of calculating the conversion matrix will now be described.

Figure 8:
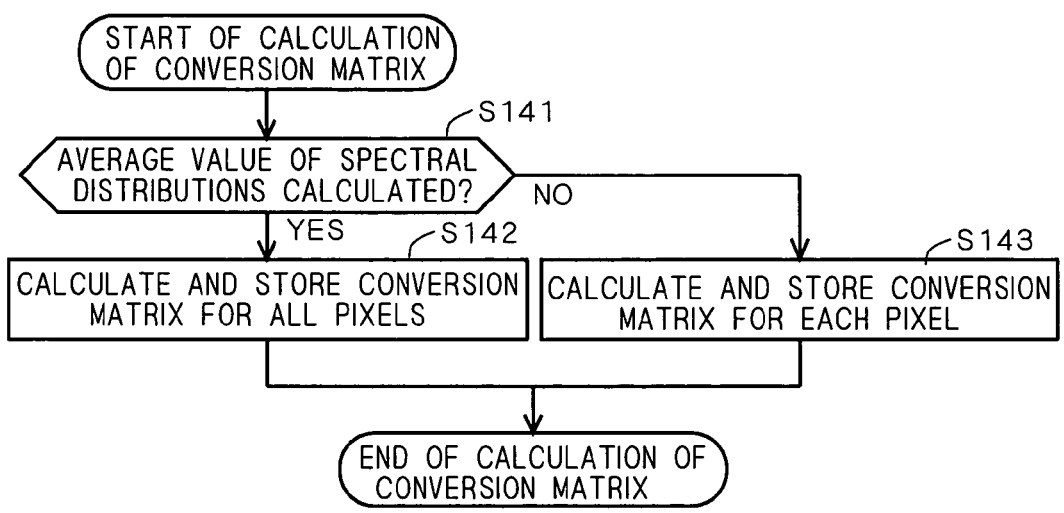
FIG. 8 is a flowchart showing a flow of the image capturing operation in the object color acquiring mode.

FIG. 17 is a block diagram showing the configuration of functions realized by the CPU 21, ROM 22, and RAM 23 mainly in the calculation of the conversion matrix together with the other configuration. FIG. 8 is a flowchart showing the flow of the operation of calculating the conversion matrix. In the configuration of FIG. 17, the conversion matrix calculating part 211 is a function realized by the CPU 21, RAM 23, and the like when the program 221 or the like stored in the ROM 22 is read by the CPU 21. The operation of calculating the conversion matrix will be described below with reference to the drawings.

Step S14 in FIG. 5 has a subroutine of FIG. 8.

In step S141, whether or not the average value of the spectral distribution of each pixel is calculated in the operation of estimating the spectral distribution of illumination is determined. Concretely, for example, the conversion matrix calculating part 211 can determine it by referring to the determination result data 238 derived by determination in step S137. If it is determined in step S141 that the average value of the spectral distribution is calculated, the program advances to step S142. If it is determined that the average value of the spectral distribution is not calculated, the program advances to step S143.

In step S142, based on the spectral distribution of illumination estimated in the operation of estimating the spectral distribution of illumination, the conversion matrix for all pixels is calculated and stored, and the conversion matrix calculating operation is finished. In the case where the average value of the spectral distribution of each pixel is calculated in the operation of estimating the spectral distribution of illumination, the spectral distribution of one illumination is estimated for all of the pixels in the pixel array G. Consequently, in step S142, the conversion matrix calculating part 211 calculates a conversion matrix on the basis of the spectral distribution of one illumination for all of the pixels (illumination spectral data 237) in accordance with the above-described conversion matrix calculating method, and stores the conversion matrix as conversion data 239 into the RAM 23.

In step S143, on the basis of the spectral distribution of unknown illumination estimated in the operation of estimating the spectral distribution of illumination, a conversion matrix is calculated and stored for each pixel, and the conversion matrix calculating operation is finished. In the case where the average value of the spectral distribution of each pixel is not calculated in the operation of estimating the spectral distribution of illumination, the spectral distribution of each unknown illumination is estimated for each pixel of all pixels in the pixel array G. Therefore, in the step S143, the conversion matrix calculating part 211 calculates a conversion matrix on the basis of the spectral distribution of unknown illumination of each pixel (illumination spectral data 237) in accordance with the conversion matrix calculating method, and stores the calculated conversion matrix as the conversion data 239 into the RAM 23. In the principle of estimating the spectral distribution of unknown illumination, necessary various data (spectral reflectance vectors $r_1, \ldots, r_n$ and the like) is pre-stored in the ROM 22 or the like and, as necessary, read to the CPU 21, RAM 23, and the like.

When the conversion matrix calculating operation is finished, the program advances to step S15 in FIG. 5.

Figure 13A:
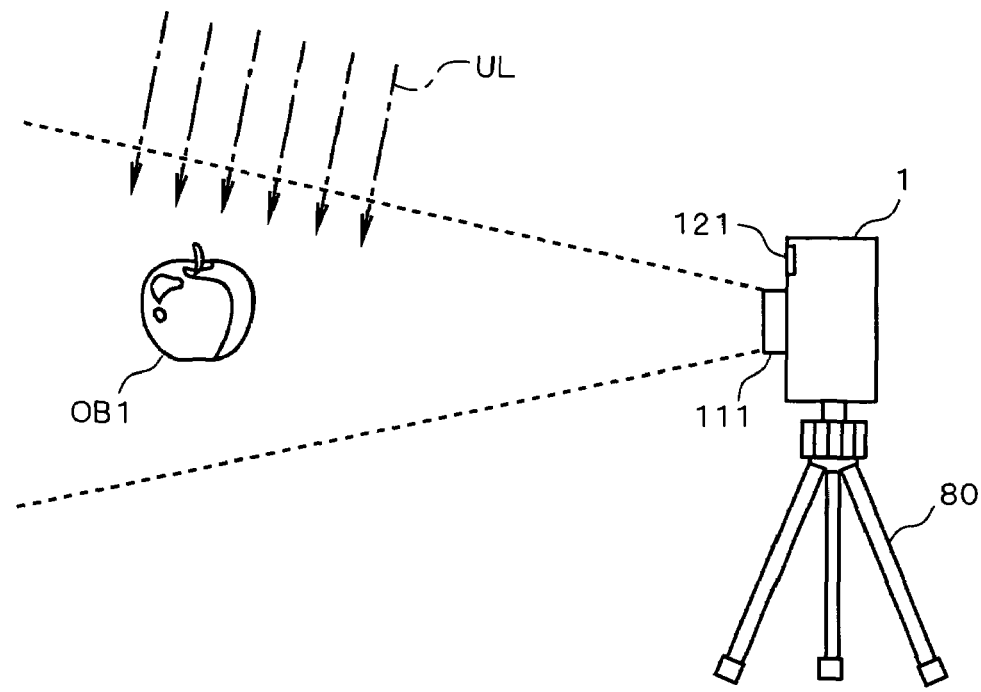
FIGS. 13A and 13B are schematic diagrams showing a state where an image of an n-th subject is normally captured.
Figure 13B:
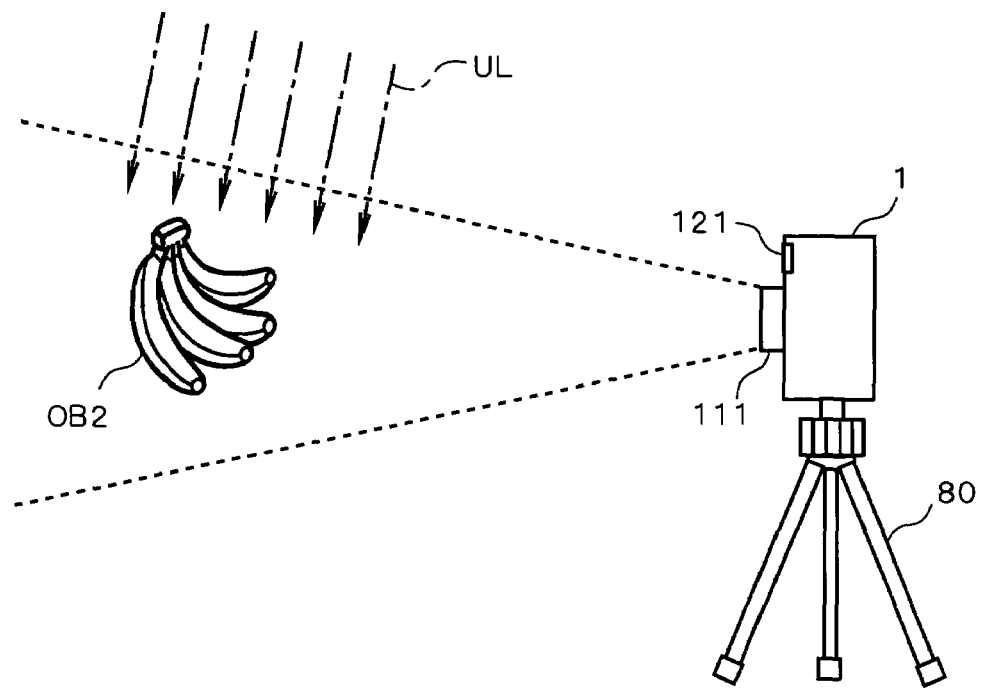

In step S15, in a manner similar to step S11, whether the shutter start button 122 is depressed or not is determined. In step S15, if the shutter start button 122 is depressed, the program advances to step S16. If the shutter start button 122 is not depressed, determination in step S15 is repeated. Depression of the shutter start button 122 to be determined in step S15 is an instruction from the user for capturing an image of another subject replacing the first subject with stationary light. Therefore, as shown in FIGS. 13A and 13B, the user disposes the n-th subject as a new object to be image-captured (for example, subjects OB1 and OB2 in FIGS. 13A and 13B, respectively) in the image capture range of the digital camera 1 and depresses the shutter start button 122 in an environment where the subject is irradiated with stationary light UL.

In step S16, an operation of estimating the object color component data of the n-th subject (hereinafter, also referred to as "object color estimation 2") is performed and the program advances to step S17.

The operation of the object color estimation 2 will now be described.

Figure 9:
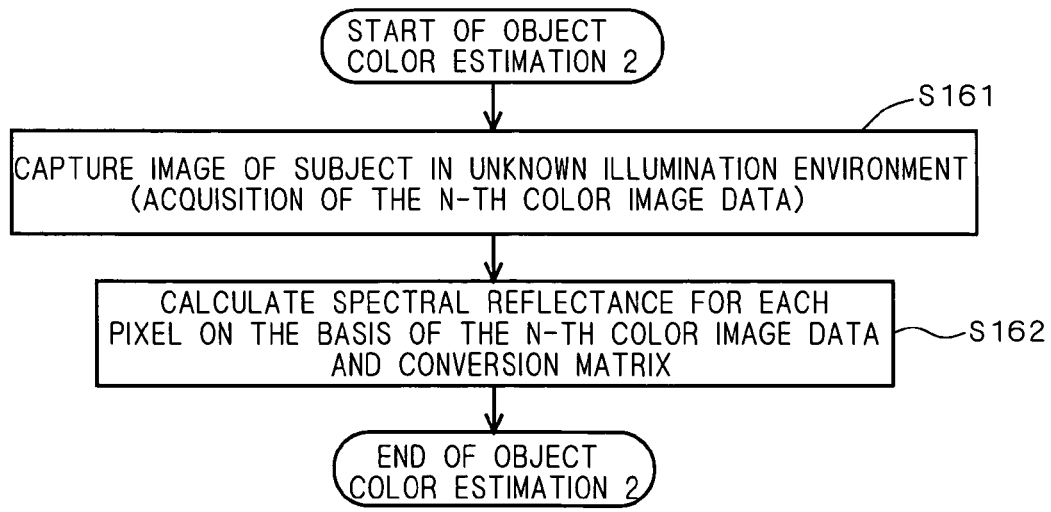
FIG. 9 is a flowchart showing a flow of the image capturing operation in the object color acquiring mode.

FIG. 18 is a block diagram showing the configuration of functions realized by the CPU 21, ROM 22, and RAM 23 mainly in the object color estimation 2 together with the other configuration. FIG. 9 is a flowchart showing the operation flow of the object color estimation 2. In the configuration of FIG. 18, an object color component data generating part 212 is a function realized by the CPU 21, RAM 23, and the like when the program 221 or the like stored in the ROM 22 is read by the CPU 21. The operation of the object color estimation 2 will be described below with reference to the drawings.

Step S16 in FIG. 5 leads to a subroutine of FIG. 9.

In step S161, an image of a subject is captured in the unknown illumination environment, and the program advances to step S162. Concretely, an image of the n-th subject is captured in the unknown illumination environment to obtain image data of the n-th subject (the n-th color image data). Specifically, without light emission of the built-in electronic flash 121, an image signal is acquired by the CCD 112, and the obtained image signal is transmitted from the A/D converter 115 to the RAM 23 and stored as n-th color image data 240. In such a manner, the n-th color image data of the n-th subject influenced only by the stationary illumination environment can be obtained.

In step S162, spectral reflectance is calculated on the basis of the n-th color image data 240 and the conversion matrix (conversion data 239) pixel by pixel. Concretely, the object color component data generating part 212 converts pixel data by the conversion data 239 with respect to each of the pixel data of the n-th color image data 240 stored in the RAM 23 in accordance with the principle 2 of computing spectral reflectance of subject. The object color component data generating part 212 calculates the spectral reflectance pixel by pixel with respect to the n-th subject, associates the calculated spectral reflectance with information for specifying the pixel, and stores them into the RAM 23, thereby generating n-th object color component data 241 in the RAM 23. After the spectral reflectance is calculated pixel by pixel in such a manner, the operation of the object color estimation 2 is finished, and the program advances to step S17 in FIG. 5.

In step S17, based on the object color component data 241 obtained in step S16, image data in a form adapted to conditions for reproduction desired by the user (hereinafter, also referred to as "color reproduction image data") is generated, and the program advances to step S18.

Generation of the color reproduction image data will now be described.

Figure 10:
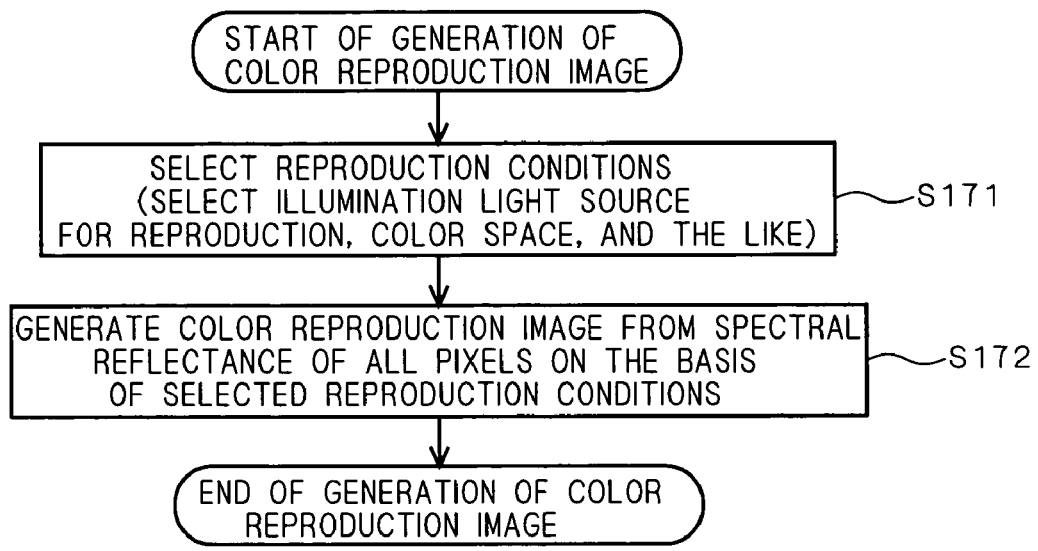
FIG. 10 is a flowchart showing a flow of the image capturing operation in the object color acquiring mode.

FIG. 10 is a flowchart showing the flow of an operation of generating the color reproduction image data. The operation flow is realized by the CPU 21, ROM 22, RAM 23, and the like. The operation of generating the color reproduction image data will be described below with reference to FIG. 10.

Step S17 in FIG. 5 leads to the subroutine of FIG. 10.

In step S171, in response to an operation on the operation button 126 by the user, conditions of reproduction desired by the user (hereinafter, also referred to as "reproduction conditions") are selected, and the program advances to step S172. The reproduction conditions include information such as the spectral distribution of an illumination light source for falsely setting illumination environments in which an image of the n-th subject is to be reproduced (outputted), a data format adapted to an output apparatus or the like, and a file storage format.

In step S172, based on the reproduction conditions selected in step S171, color reproduction image data is generated in the RAM 23 from the spectral reflectance of all of the pixels of the n-th object color component data generated by the object color estimation 2, and the flow of the operation of generating the color reproduction image data is finished. The program advances to step S18 in FIG. 5.

In step S18, the n-th object color component data estimated in step S16 and the color reproduction image data generated in step S17 are stored in the external memory 123, and the program advances to step S19.

In step S19, whether the power source is set to OFF or not, or whether the mode is switched or not is determined. If the power source is set to OFF or the mode is switched, the image capturing operation in the object color acquiring mode is finished. On the other hand, if the power source is not set to OFF and the mode not switched, the program returns to step S15, the subject is replaced with the next subject, and object color component data and color reproduction image data of the next subject can be obtained.

As described above, in the digital camera 1 according to the preferred embodiment of the present invention, first, a sample as a reference is used as a first subject and image-capturing with electronic flash light is performed under conditions so that the influence of the electronic flash light becomes the maximum, thereby obtaining first color image data. On the basis of the first color image data, the first object color component data of the first subject is estimated. After that, an image of the first subject is captured in the unknown illumination environment, thereby obtaining second color image data. By using the first object color component data and the second color image data, the spectral distribution of unknown illumination is estimated. Subsequently, based on the estimated spectral distribution of unknown illumination, a conversion matrix for converting the color image data of the subject obtained in the unknown illumination environment into the object color component data is calculated. As a result, though subjects are sequentially changed in the same unknown illumination environments, only by simply obtaining the color image data of each of the subjects and converting the color image data by the conversion matrix, object color component data of each subject can be easily obtained. Therefore, it is unnecessary to emit electronic flash light each time the subject is changed, so that the energy consumption amount can be reduced. Since a filter is not used, it does not cause complication in the configuration of the digital camera 1. Consequently, even if the spectrally distribution of light for illuminating the subject is not known in advance, once the conversion matrix is calculated, the object color component data of a plurality of objects can be promptly and easily obtained.

On the basis of pixel data satisfying a predetermined luminance condition in the first color image data, object color component data is estimated with respect to the part corresponding to the pixel data in the first subject, that is, a region as a part of the first subject, to which electronic flash light sufficiently reaches. By using the estimated first object color component data, the spectral distribution of stationary light is estimated. Therefore, also in the case where electronic flash light reaches only a part of the first subject, the spectral distribution of stationary light can be estimated and the conversion matrix can be calculated.

By employing the configuration of the digital camera 1 or the like, also in the case where there are a plurality of light sources of unknown light and the subject is irradiated with mixed light from the plurality of light sources, the spectral distribution of the mixed light can be estimated and a proper conversion matrix can be calculated.

A professional cameraman or the like often uses PhotoRetouch using normal color image data as an original image. However, to obtain color image data by using normal color image data as an original image and falsely changing an illumination light source or the like by PhotoRetouch, considerable know-how is required. It is difficult for non-professional people to freely use PhotoRetouch in such a manner.

The object color component data of the subject acquired in the above manner can be used as an original image of PhotoRetouch. In the digital camera 1, only by selecting reproduction conditions including illumination environments in response to an operation on the operation button 126 by the user, based on the spectral distribution of an object color in each pixel and the (known) spectral distribution of an arbitrary illumination light source, color image data with the illumination light source can be easily generated (irrespective of whether image-capturing is performed with the illumination light source or not). By inputting the object color component data obtained by the digital camera 1 into a computer and changing a tone or the like through various filter processes, the same effects as those produced when image-capturing is performed with various filters in front of a lens can be easily realized without actually using filters.

The digital camera 1 can promptly and easily obtain object color component data on which processing after PhotoRetouch is easily performed with respect to a plurality of subjects as objects.

There is the possibility that a system for easily acquiring object color component data of a plurality of subjects like the digital camera 1 is often used at medical field. For example, there is a case that a doctor examines a patient on the basis of colors of various regions of the body of the patient (hereinafter, also referred to as "regions to be examined"). In the case where a doctor examines a patient in a remote place, the doctor may examine the patient by seeing an image of a region to be examined, which is captured by a digital camera. However, if an image of the region to be examined is simply captured by a digital camera, a known white balance process is performed in the digital camera and the color of the region to be examined variously changes according to image-capturing environments. It disturbs accurate examination.

In contrast, by using the digital camera 1 of the present invention, object color component data of the region to be examined can be easily acquired. Further, by selecting an illumination light source for reproduction suitable for medical examination, a doctor can examine the region to be examined falsely under the illumination light source which is always fixed.

Modifications

Although the preferred embodiment of the present invention has been described above, the present invention is not limited to the above.

For example, in the foregoing preferred embodiment, the operations of the object color estimation 1, estimation of the spectral distribution of illumination, calculation of the conversion matrix, object color estimation 2, and the like are performed by the single digital camera 1. The present invention, however, is not limited to the arrangement. For example, the operations may be performed by a system constructed by a digital camera and a personal computer. In other words, the image input system according to the present invention may be constructed by a combination of a plurality of apparatuses, like a camera, a personal computer, and the like.

It is preferable to acquire all of color image data of all subjects by a single CCD in order to obtain the object color component data since the configuration of the image input system is simple and it is advantageous. Since the spectral distribution of illumination gradually changes on a subject in space, there is the possibility that the spectral distribution of illumination gradually changing among the pixels. In such a case, by acquiring color image data of a plurality of subjects from the same position by using the same CCD, estimation of the object color component data becomes more accurate. Therefore, also from such viewpoint, it is preferable to acquire all of color image data of all subjects by a single CCD.

Although the first object color component data is estimated on the basis of the first color image data acquired by a single image-capturing operation with electronic flash light in the foregoing preferred embodiment, the present invention is not limited to the preferred embodiment. For example, as disclosed in Japanese Patent Application Laid-Open Nos. 2001-78202, by using image data based on light from a subject via a predetermined filter, image data based on light from the subject without through the predetermined filter, and the spectral transmittance of the filter, the first object color component data can be estimated. With such a configuration, without emission of electronic flash light of even once, the object color component data of a plurality of subjects can be estimated. As a result, the energy consumption amount can be reduced. Even if the spectral distribution of light illuminating the subject is unknown, once a conversion matrix is calculated, object color component data of a plurality of objects can be promptly and easily obtained.

Therefore, as methods of estimating the first object color component data, various methods can be employed as long as the methods acquire color image data of a first subject under predetermined image-capturing conditions and estimate the first object color component data by using the color image data. The predetermined image-capturing conditions are conditions for capturing an image of a first subject by exerting an influence of illumination except for stationary light directly or falsely to the first subject by using an electronic flash, a filter, or the like. In other words, the predetermined image-capturing conditions are conditions related to illumination (also referred to as "predetermined illumination conditions") including an illumination condition for irradiating the subject with predetermined illumination light by an electronic flash or the like and a filter setting condition for falsely creating the same state as that in which the subject is irradiated with the predetermined illumination light by acquiring an image on the basis of light passed via a filter. At the time of estimating the object color component data, the influences of illumination other than stationary light, specifically, the spectral distribution of electronic flash light, the transmission characteristic of light of a filter or the like, and so on have to be known in advance.

In the method of estimating the first object color component data by using a predetermined filter, even when a first subject is apart from the digital camera to the extent that electronic flash light does not reach the first subject, the first object color component data can be estimated. However, a predetermined filter and a mechanism for driving the predetermined filter are necessary, and there are disadvantages such that the configuration of an image input system such as a digital camera is complicated. From a viewpoint of avoiding complication of the configuration of the image input system, it is preferable to estimate the first object color component data by the method of performing image-capturing with electronic flash light as in the preferred embodiment.

In the method of estimating the first object color component data on the basis of the first color image data acquired by a single image-capturing operation with electronic flash light as in the foregoing preferred embodiment, the first object color component data can be estimated in short time. Consequently, from a viewpoint of promptly acquiring the object color component data of a plurality of subjects, it is more practical and can be said preferable to employ the method of estimating the first object color component data on the basis of the first color image data acquired by a single image-capturing operation with electronic flash light.

Although the spectral reflectance "r" is made discrete by 31 representative values in increments of 10 nm in the wavelength region of 400 nm to 700 nm of visible light in the foregoing preferred embodiment, the present invention is not limited to the above. For example, the spectral reflectance "r" may be made discrete by representative values in other increments such as increments of 5 nm or 1 nm in the wavelength region of 400 nm to 700 nm of visible light. Similarly, the spectral distribution vector E of illumination is not limited by being made discrete by 31 representative values in increments of 10 nm in the wavelength region of 400 nm to 700 nm of visible light but may be made discrete by representative values in other increments such as increments of 5 nm or 1 nm in the wavelength region of 400 nm to 700 nm of visible light. With respect to the spectral distribution vector E of illumination, by making the spectral reflectance "r" discrete by representative values in relatively fine increments such as increments of 5 nm or 1 nm, precision of estimation of the spectral distribution of illumination can be improved also in the case where a remarkably high peak occurs in a very narrow wavelength region in the spectral distribution of illumination due to the bright line of a fluorescent lamp or the like.

Further, although the wavelength region of visible light is set as a region from 400 nm to 700 nm in the foregoing preferred embodiment, the present invention is not limited to the region. The wavelength region of visible light may be set to other regions such as a region from 380 nm to 780 nm.

While the invention has been shown and described in detail, the foregoing description is in all aspects illustrative and not restrictive. It is therefore understood that numerous modifications and variations can be devised without departing from the scope of the invention.

What is claimed is:

1. An image input system comprising:
   an acquiring part for acquiring color image data of a subject;
   an object color estimating element for estimating first object color component data of a first subject by using first color image data of said first subject acquired by said acquiring part under predetermined conditions;
   an illumination light estimating element for estimating a spectral distribution of stationary light on the basis of second color image data of said first subject acquired by said acquiring part under said stationary light and said first object color component data; and
   a calculating element for calculating a conversion matrix for converting third color image data of a second subject acquired under said stationary light to second object color component data of said second subject by using said spectral distribution.

2. The image input system according to claim 1, further comprising:
   a light emitting part for emitting light toward a subject, wherein
   said acquiring part acquires said first color image data of said first subject irradiated with light by said light emitting part, and
   said object color estimating element includes a detector for detecting pixel data satisfying a predetermined luminance condition from said first color image data, and an estimating element for estimating said first object color component data on the basis of pixel data detected by said detector.

3. The image input system according to claim 1, further comprising:
   a converter for converting said third color image data of said second subject acquired under said stationary light to object color component data of said second subject by said conversion matrix.

4. The image input system according to claim 2, further comprising:
   a converter for converting said third color image data of said second subject acquired under said stationary light into object color component data of said second subject by said conversion matrix.

5. The image input system according to claim 2, wherein said acquiring part acquires said third color image data of said second subject under said stationary light.

6. The image input system according to claim 3, wherein said acquiring part acquires said third color image data of said second subject under said stationary light.

7. The image input system according to claim 4, wherein said acquiring part acquires said third color image data of said second subject under said stationary light.

8. A conversion matrix calculating method comprising the steps of:
   acquiring first color image data of a first subject under a predetermined condition;
   estimating first object color component data of said first subject by using said first color image data;
   acquiring second color image data of said first subject under stationary light;
   estimating a spectral distribution of said stationary light on the basis of said second color image data and said first object color component data; and
   calculating a conversion matrix for converting third color image data of a second subject acquired under said stationary light into object color component data of said second subject by using said spectral distribution.

9. A computer software product including a recording medium in which a computer-readable software program is recorded, said software program being able to be executed by a computer included in an image input system and being directed to a process for calculating a conversion matrix, said process comprising the steps of:
   acquiring first color image data of a first subject under a predetermined condition;
   estimating first object color component data of said first subject by using said first color image data;
   acquiring second color image data of said first subject under stationary light;
   estimating a spectral distribution of said stationary light on the basis of said second color image data and said first object color component data; and
   calculating a conversion matrix for converting third color image data of a second subject acquired under said stationary light into object color component data of said second subject by using said spectral distribution.

* * * * *